(12) United States Patent
Sakashita

(10) Patent No.: US 7,027,016 B2
(45) Date of Patent: Apr. 11, 2006

(54) DISPLAY APPARATUS AND IMAGE SIGNAL PROCESSING APPARATUS

(75) Inventor: Yukihiko Sakashita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 706 days.

(21) Appl. No.: 09/845,282

(22) Filed: May 1, 2001

(65) Prior Publication Data

US 2002/0021292 A1   Feb. 21, 2002

(30) Foreign Application Priority Data

May 8, 2000 (JP) ............................. 2000-134440
Apr. 26, 2001 (JP) ............................. 2000-129125

(51) Int. Cl.
*G09G 3/34* (2006.01)

(52) U.S. Cl. ..................... 345/84; 345/207; 345/690; 359/630

(58) Field of Classification Search ............... 345/84, 345/102, 87, 100, 207, 518, 690; 359/630–631; 349/62
See application file for complete search history.

(56) References Cited

U.S. PATENT DOCUMENTS

| | | | |
|---|---|---|---|
| 4,351,600 A * | 9/1982 | Hasegawa et al. | 396/203 |
| 5,132,839 A * | 7/1992 | Travis | 359/462 |
| 5,315,377 A * | 5/1994 | Isono et al. | 348/51 |
| 5,519,533 A * | 5/1996 | Nomura et al. | 359/478 |
| 5,592,188 A | 1/1997 | Doherty et al. | 345/84 |
| 5,896,163 A * | 4/1999 | Tsuda et al. | 347/255 |
| 6,454,411 B1 * | 9/2002 | Trumbull | 351/211 |
| 6,813,041 B1 * | 11/2004 | Moroney et al. | 358/1.9 |

FOREIGN PATENT DOCUMENTS

| | | |
|---|---|---|
| JP | 6-102484 | 4/1994 |
| JP | 6-167717 | 6/1994 |
| JP | 2643712 | 8/1997 |
| JP | 10-78550 | 3/1998 |
| JP | 11-65528 | 3/1999 |

* cited by examiner

*Primary Examiner*—Alexander Eisen
*Assistant Examiner*—Kimnhung Nguyen
(74) *Attorney, Agent, or Firm*—Fitzpatrick, Cella, Harper & Scinto

(57) ABSTRACT

To attain high image quality such as high resolution and high dynamic range in a display apparatus for irradiating light generated by a light source onto a light modulating element and for forming a display image plane from the light transmitted through or reflected by the light modulating element.

The apparatus is configured to control irradiation light quantity, in which the high image quality is provided by an unit for temporarily storing display signal, an unit for adjusting signal under an analog state, a unit for differentiating a rate of change in light quantity at the time of increase and at the time of decrease and a unit for controlling light quantity to resemble hysteresis.

18 Claims, 15 Drawing Sheets

DISPLAY APPARATUS AND IMAGE SIGNAL PROCESSING APPARATUS

BACKGROUND OF THE INVENTION

1. Field of the Invention

The present invention relates to a display apparatus as well as a signal processing apparatus for a display apparatus that is suitable for application to a large image plane/highly accurate display apparatus such as a liquid crystal display and a projector, etc.

2. Related Background Art

Advent of the multimedia age brings display apparatus to all the scenes, and since projection type display apparatus is efficient compared with other systems in particular, front projectors are in common use for presentations, etc. and rear projectors are in common use for domestic theaters.

In recent years, CRT projection is being replaced by a projector in a liquid crystal panel system and a DMD (digital mirror device, for which reference should be made to Japanese Patent Application Laid-Open No. 10-78550) method modulating light quantity by changing angles of an mirror which are turning to spread because they are appropriate for providing high luminance and highly delicate accuracy.

However, these projection-type display apparatuses is inferior to CRT display tubes in general use in terms of picture quality, and for high picture quality display (display demanded for quality feeling), users tend to use CRT display tubes even when the image plane size is small. High picture quality (quality feeling) herein referred to is high dynamic range (capability of high contrast and high gradation display).

Since a CRT, luminance of which can be modulated with electron beam intensification, etc., dynamic range can realize up to around 1000:1 in the case where only a particular range (a partial region) displays white, etc. Accordingly, its potentiality can make white brighter and black darker to realize excellent picture quality. However, in case of a CRT system, the size thereof is around 40 inches at largest due to limitation in a tube, etc., giving rise to a problem that there exists a high degree of technological difficulty for larger sizes.

On the other hand, in a projection-type display apparatus, a CRT system is traded off in terms of its engine size, brightness and high accuracy, etc, and as described above, a liquid crystal system as well as a DMD system is suitable for high luminance and high accuracy is recently in a main stream. In these cases, the liquid crystal and the DMD are assigned to play roles of a light modulator, and a lamp illuminates the above described liquid crystal device or DMD to be enlarged for projection by a projection optical system. Accordingly, the above described dynamic range is determined wit the dynamic range mainly provided by the liquid crystal device or DMD.

The practical dynamic range of the above described device is approximately 300 to 400:1 for liquid crystals and approximately 500 to 600:1 for DMDs. Accordingly, they used to have a problem that there is a long way to win against the above described CRT system in terms of one point of high picture quality (high dynamic range).

In addition, a direct-view-type LCD likewise used to have a problem that its dynamic range is low, compared with the CRT.

Incidentally, as background documents of the present application, Japanese Patent No. 2643712, Japanese Patent Application Laid-Open No. 6-102484 and Japanese Patent Application Laid-Open No. 11-65528 and Japanese Patent Application Laid-Open No. 6-167717 are nominated.

SUMMARY OF THE INVENTION

An objective to be solved by the present invention application is to realize high picture quality in a projection-type display apparatus or direct-view-type apparatus irradiating lights to a light modulating element to construct display image planes by its penetrating light or reflected light.

Another objective of the mode of embodiments of the present application is to provide a system to attain high picture quality of a high dynamic range to be attached to features of large image plane and high accuracy of the projection-type display apparatus.

Moreover, the above described system is to attain the above described objective with an existing device, which might be a liquid crystal device and DMD having levels thereof, in combination, and is a low-cost and practical system.

In addition, the objective includes providing a system to attain high picture quality of high dynamic range to be attached to features of high degree of resolution in a direct-view-type liquid crystal display apparatus provided with back light.

One aspect of the present invention application is constructed as follows.

A display apparatus irradiating light generated by a light source onto a light modulating element and forming a display image plane with the light transmitted through or reflected by the light modulating element, comprising:

input image calculating means for performing predetermined calculation according to an input display signal;

light quantity controlling means for controlling light quantity irradiated onto the above described light modulating element according to a result of the above described calculation; and a memory for storing display signal subjected to the above described calculation by the input image calculating means, and for outputting thereafter the display signal to the above described light modulating element.

Here, the display signal is referred to as an image signal and an image data to be inputted.

In this invention, a memory is provided so as to temporally store the display signal after calculation, and therefore, even if light quantity control takes time, it will become possible that the signal to be inputted to the light modulating element are easily brought into synchronization with the light quantity control corresponding with the signals.

Another aspect of the present invention is constructed as follows.

A display apparatus irradiating light generated by a light source onto a light modulating element inputting a modulated signal formed by converting display signal inputted in an analog state into digital display signals and thereafter subjected to the converted digital display signal to a predetermined processing, and forming a display image plane from the light which transmitted through or reflected by the light modulating element, comprising:

input image calculating means for performing predetermined calculation according to the display signal;

light quantity controlling means for controlling light quantity irradiated onto the above described light modulating element according to a result of the above described calculation; and an adjusting circuit for adjusting display signal according to a result of the above described calculation, wherein the above described adjusting circuit adjusts display signal before the conversion of the display signal in the above described analog state into the digital display signal.

Incidentally, in this invention, the display signal to undergo calculation may be in an analog state or may be those having undergone digital conversion.

In addition, adjustment referred to herein is exemplified by amplification.

In addition, prior to inputting to the modulating element, signal may be converted into analog display signal again after that is converted from analog display signal to digital display signal and undergo a predetermined processing.

In addition, another aspect of the present invention is constructed as follows.

A display apparatus irradiating light generated by a light source onto a light modulating element and forming a display image plane from the light transmitted through or reflected by the light modulating element:

input image calculating means for performing predetermined calculation according to the display signal; and light quantity controlling means for controlling light quantity irradiated onto the above described light modulating element according to a result of the above described calculation, wherein the above described light quantity controlling means sets a change rate when the above described light quantity is decreased to a smaller one than a change rate when the light quantity is increased.

The change rate referred to herein is in particular the one obtained by dividing the difference between the light quantity at start of change and the light quantity at completion of change with time from start of change to when to reach a desired light quantity.

In addition, another aspect of the present invention is constructed as follows.

A display apparatus irradiating light generated by a light source onto a light modulating element and forming a display image plane from the light transmitted through or reflected by the light modulating element, comprising:

input image calculating means for performing predetermined calculation according to an input display signal; and light quantity controlling means for increasing or decreasing a light quantity irradiated onto the above described light modulating element step by step according to a value determined by result of the above described calculation, wherein a threshold value at which the above described light quantity controlling means increases a first stage being a predetermined stage to a second stage by increasing the above described light quantity by one stage corresponding with a value determined by the above described calculation is different from a threshold at which the above described second stage is decreased to a stage with less light quantity.

Here, the above described light quantity controlling means preferably set so as to increase the above described light quantity from the above described first stage to the above described second stage when the value determined by the above described calculation changes in the first direction to exceed the first threshold value, and so as to decrease the above described light quantity from the above described second stage to a stage with less light quantity when the value determined by the above described calculation changes in the second direction being opposite against the above described first direction to exceed the second threshold value set in the side of the above described second direction than the above described first threshold value. In addition, here the stage of the above described low light quantity being the above described first stage can be controlled easily.

In addition, the aspects of the present invention described above suitably have adjusting circuits to adjust display signals corresponding with outcomes of the above described calculation. In addition, in the case where in the above described input image calculating means, a memory to store and thereafter output display signals having become an object for calculation toward the above described light modulating element, positions where the memory is provided can be appropriately set. For example, it can be provided in the preceding stage of the adjusting circuit.

Incidentally, various setting is possible for adjustment executed by this adjusting circuit, and in case of executing amplification, for example, a construction to amplify display signals at an amplifying ratio approximately in inverse proportion to light quantity illuminated to the above described light modulating element can be suitably adopted.

In addition, in the aspects of the present invention described above, such constructions that the above described calculation could be calculation to give maximum luminance in the above described display signals inputted within a predetermined period or could be calculation to give a certain number of data exceeding a predetermined luminance in luminance data that the above described display signals to be inputted within a predetermined period include can be suitably adopted. Here, as the predetermined period, 1 frame time or 1 field time in the case where 1 frame is constructed with a plurality of fields can suitably be adopted. In addition, for a section to count the above described luminance data, luminance data corresponding with one pixel is would be better to count as one luminance data.

In addition, the above described aspects of the present invention further have sensors to detect light quantity illuminated onto the above described light modulating element, suitably wherein the above described light quantity controlling means control the above described light quantity based on the above described calculation results and results detected by the above described sensors.

In addition, the display signals are adjusted corresponding with the above described calculation results, the adjusting circuit can suitably adopts a construction to execute the above described adjustment corresponding the above described calculation results and the results detected by the above described sensors.

In addition, the aspects of the present invention described above can suitably adopt a construction to comprise irradiation light quantity changing quantity setting means to set changing quantity or change rate of the above described irradiation light quantity.

In addition, the aspects of the present invention described above can suitably adopt such construction that the above described light quantity controlling means are means to be disposed between the above described light source and the above described light modulating element to control light quantity to be irradiated to the above described light modulating element from the above described light source or such construction being means to control voltages or currents to be supplied to the above described light source.

Incidentally, the aspects of the present invention described above can be used appropriately in combination.

In addition, the present application includes an invention of the image signal processing apparatus to be used in the above described display apparatus.

DESCRIPTION OF THE PREFERRED EMBODIMENTS

A display apparatus according to a preferred embodiment of the present invention is characterized in that it is provided with means to adjust light quantity to illuminate a light modulator (a liquid crystal device and a DMD), a circuit for processing a signal to the light modulator based on the above described illuminated light quantity and means for writing in that signal.

A projection-type display apparatus related to a preferable embodiment of the present invention is, as its features, provided between a light source and a light modulator (a liquid crystal device and a DMD) means (irradiation light quantity modulating means) to adjust light quantity to illuminate the above described light modulator, a circuit for processing a signal to the light modulator based on the above described illuminated light quantity and means for writing in that signal.

The above described signal processing circuit may comprise amplifying means to amplify an input image signal at an amplifying ratio in inverse proportion to the above described light quantity or light quantity controlling signals.

According to the present invention, provision of irradiation light quantity modulating means to adjust light quantity illuminated onto the light modulator can make it possible to illuminate a dark image plane with low light quantity and a bright image plane with high light quantity, and consequently to realize a dynamic range higher than in the case where the light modulator is illuminated with constant light quantity.

In addition, controlling the light quantity and the signal amplifying ratio in approximately inverse proportion by means of the signal processing circuit to become an adjusting circuit to adjust the above described display signals and the signal write-in means, high dynamic range can be realized while maintaining display luminance in an intermediate gradation at a constant.

The above described irradiation light quantity modulating means may be the one to directly control a light source generating a light to be caused to illuminate the light modulator or the one to be provided between the light source and the light modulator to modulate transmissivity of the irradiation light quantity. As the former, means to control voltages or currents to be supplied to the light source and as the latter the one which has means to convert a light flux from the light source into a polarized light flux together with the polarizing plate or a phase plate disposed capable of rotation in combination can be exemplified.

EMBODIMENTS

With reference to the drawings, embodiments of the present invention will be described below.

Embodiment 1

Figure 1:
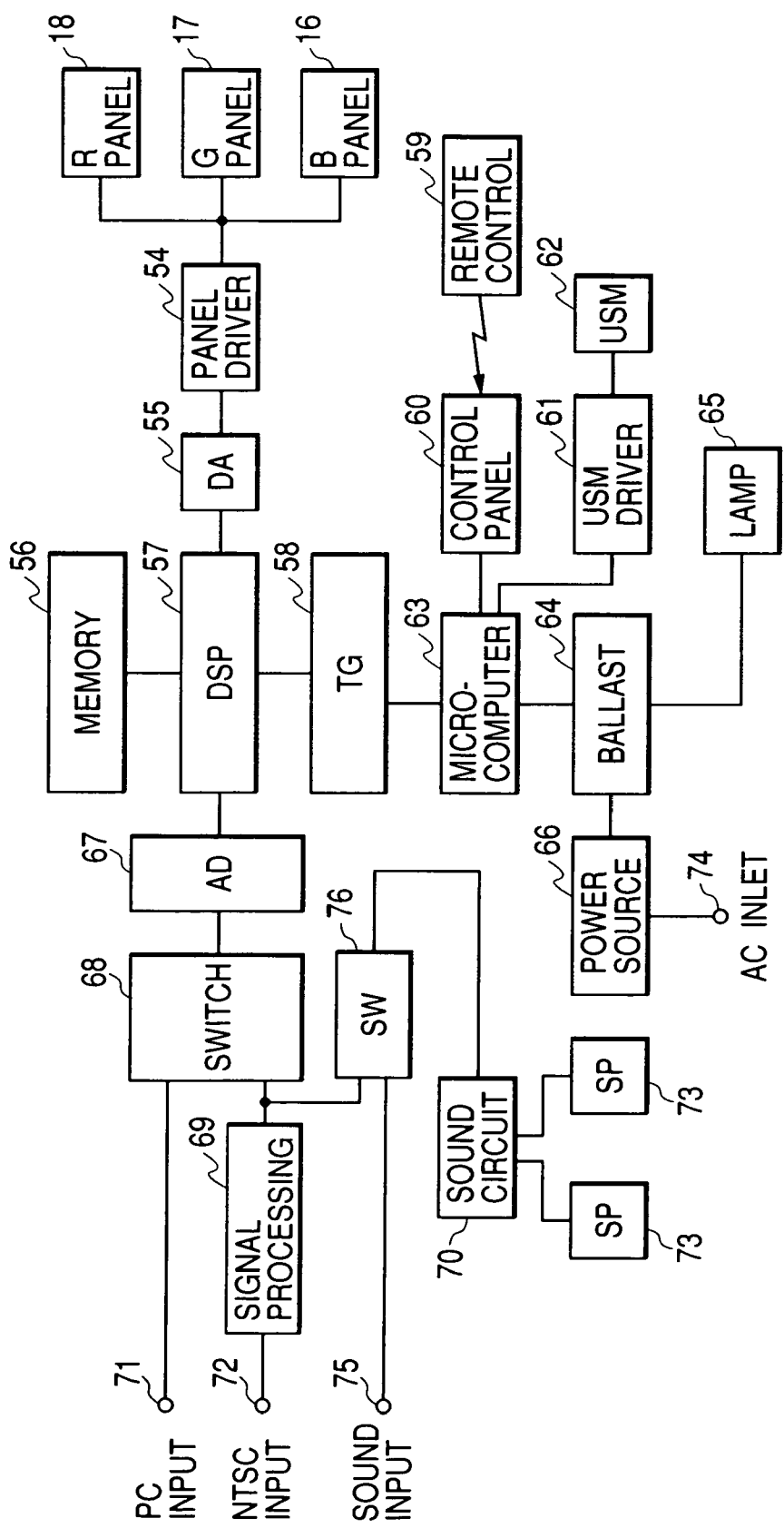
FIG. 1 is a block diagram showing electric system related to a first embodiment.

FIG. 1 shows a block diagram of a signal processing apparatus related to an embodiment of the present invention.

In FIG. 1, reference numerals 18, 17 and 16 denote liquid crystal panels in correspondence with R, G and B color display respectively, reference numeral 54 denotes a driver circuit to supply each liquid crystal panel with applying signals and power source, reference numeral 55 denotes a DA converter and reference numeral 56 denotes a memory. The memory 56 holds current display data as well as data to be displayed in the next frame and the like. Reference numeral 57 denotes a DSP unit to execute not only processing such as gamma adjustment, conversion of interlace signals to non-interlace signals, resolution conversion in the case where the pixel amount of liquid crystal panel currently in use does not corresponds with the pixel amount of the input signal and color adjustment, etc. but also operation to calculate signal levels of respective colors for irradiation light quantity control. Reference numeral 58 denotes a timing generator circuit and reference numeral 59 denotes a remote controller to execute power source ON-OFF switching as well as respective kinds of settings. Reference numeral 60 denotes a control panel for receiving signals from the remote controller and executing respective kinds of input signal switching, etc. and reference numeral 61 denotes a driver for ultrasonic motor for modulating (controlling) irradiation light quantity and reference numeral 62 denotes an ultrasonic motor. Reference numeral 63 denotes a microcomputer to which the memory 56, the DSP unit 57, the timing generator circuit 58, the control panel 60, the USM driver 61, the power source 66 and a ballast for a lamp 64, etc. are brought into connection via a bus to control those respective blocks. The lamp 65 is connected with the ballast 64. Reference numeral 67 denotes an A/D converter and reference numeral 68 denotes a switch. Reference numeral 69 denotes a signal processing circuit, which executes signal processing such as decoding NTSC signals, noise reducing processing, band limitation filtering and signal level adjustment, etc. Reference numeral 71 denotes a PC (personal computer) input terminal and reference numeral 72 denotes an NTSC input terminal, but in the present block diagram, only an analog input signal is indicated, but without limitation thereto, it goes without saying that input terminals such as LVDS and TMDS, etc. and a D3 terminal for a digital TV, etc. may be provided to function effectively.

Reference numeral 75 denotes a sound input terminal, reference numeral 76 denotes a sound switching switch, reference numeral 70 denotes a sound processing circuit, reference numeral 73 denotes a speaker and reference numeral 74 denotes an AC inlet.

With reference to an electric block diagram in FIG. 1, basic operation on driving the irradiation light quantity modulation system of the present embodiment (operation of a system to write signals into a liquid crystal panel corresponding with a maximum luminance level determined by image signals) will be described.

Signals inputted from the input terminals 71 and 72 are converted into digital signals via an AD converter 67 and temporally stored into the memory 56. At that time, the maximum luminance level at that frame is calculated, and currents or voltages to be supplied to the light source via rotation angle of the polarizing plate or phase plate or ballast 64 with which irradiation light quantity corresponding with that maximum luminance level is obtained are calculated, and signals to realize a desired luminance at each pixel when the irradiation light in that light quantity is illuminated onto the panels are calculated and written. Signals from the memory 56 are read out in synchronization with light quantity control corresponding with signals being stored. A method of calculation of the above described maximum luminance level will be described later.

Figure 2:
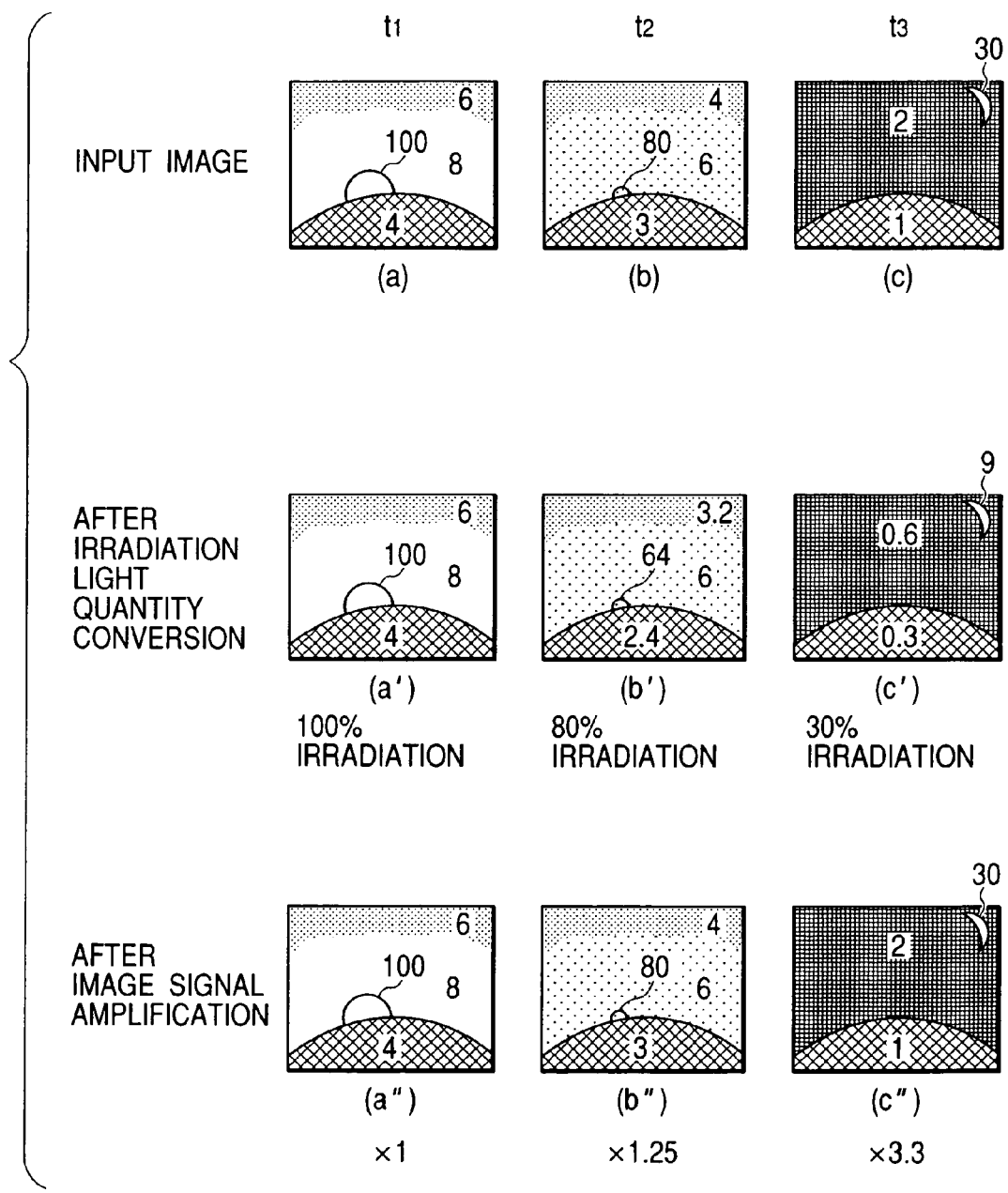
FIG. 2 is an explanatory view showing display examples according to the present invention.

With reference to FIG. 2, a relationship between light quantity modulation and signal gains in respective display images will be described.

(a) of FIG. 2 shows images at the time t1 in which the sun is coming down below a mountain while the recess of a mountain and the sky are becoming dark. Numerical values in FIG. 2 represent luminance levels of that image. (b) of FIG. 2 shows an image after time has lapsed than (a) of FIG. 2, and the picture gets further darker subject to sunset. The peak at that time reaches 80% level compared with the preceding frame (a). The case (c) where time has further lapsed to enter night with the moon appearing in the sky so that the maximum luminance level reaches 30%.

Here, with respect to each image data, for (a) a light of 100% level is illuminated to the liquid crystal panel, for (b) a light of 80% level and for (c) a light of 30% level is illuminated. The displayed images for respective cases will become (a'), (b') and (c'). Here, the reduced portion of the irradiation light is supplemented by amplifying signals. In (a') of FIG. 2, due to absence of drop in light quantity, the amplifying ratio is set at 1, in (b') of FIG. 2, the amplifying ratio is set at 1.25 times and in (c') of FIG. 2, the amplifying ratio is set at 3.3 times. They will result in (a"), (b") and (c") of FIG. 2 so that display luminance is maintained.

As described so far, combination of amplifying light quantity modulation and signals will enable improvement in dynamic range by broadening a displayable gray scale near a black level while maintaining display luminance.

With the dynamic range of the liquid crystal being 200:1, black levels of luminance level of not more than 0.5 cannot be displayed when 100% light quantity is illuminated, but according to the present embodiment, as the entire image plane is getting darker, the displayable range of the black level gets broader, and therefore further enhanced black display can be realized. In the case where the entire image plane is bright or is influenced by reflection lights from external lights, the recognition level on delicate difference of the black level could drop to human eyes, and reproducibility of black will not be so remarkable. However, as a scene gets darker, that reproducibility becomes important, but that is matched the above described technology, and in case of the above described embodiment, the dynamic range will be practically improved to reach approximately 660:1.

In case of such a source with a lot of dark image scenes as in films, etc., the present effect is enormous, and images with good reproducibility of black and with improved dynamic range have become available.

In the present embodiment, a method to improve the dynamic range with the reduced portion of the irradiation light being supplemented by amplifying signals while display luminance is maintained has been described, a method to cause the signal gain to exceed the reduced portion of the irradiation light in order to use the dynamic range of the LCD effectively is effective.

Next, how to calculate a maximum luminance from image signals in further particular, moreover how to calculate a desired irradiation light quantity level from that calculated maximum luminance data, and how to determine an amplifying ratio of image signals from the irradiation light quantity level will be described in detail.

Maximum luminance is calculated by sequentially comparing input image data inside 1 frame or 1 field. In this case, since comparison on every pixel could lead to miscalculation of maximum luminance due to influence of noises, etc., it is also effective that the maximum luminance is calculated by comparing values undergoing averaging (or averaging with weight) several pixels in the vicinity of the target pixel as respective pixel values.

Figure 3:
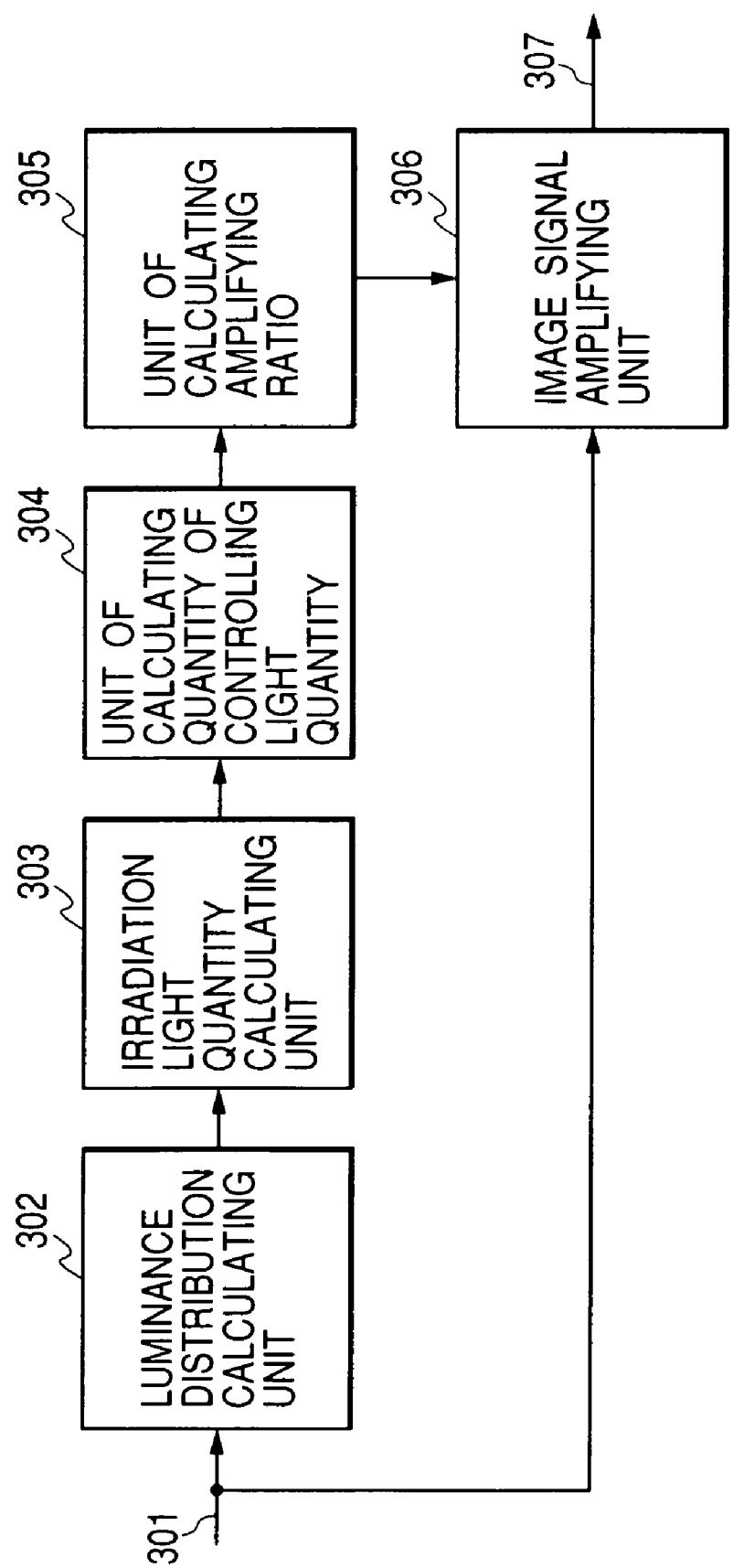
FIG. 3 is a block diagram showing a processing flow according to a first embodiment of the present invention.
Figure 4:
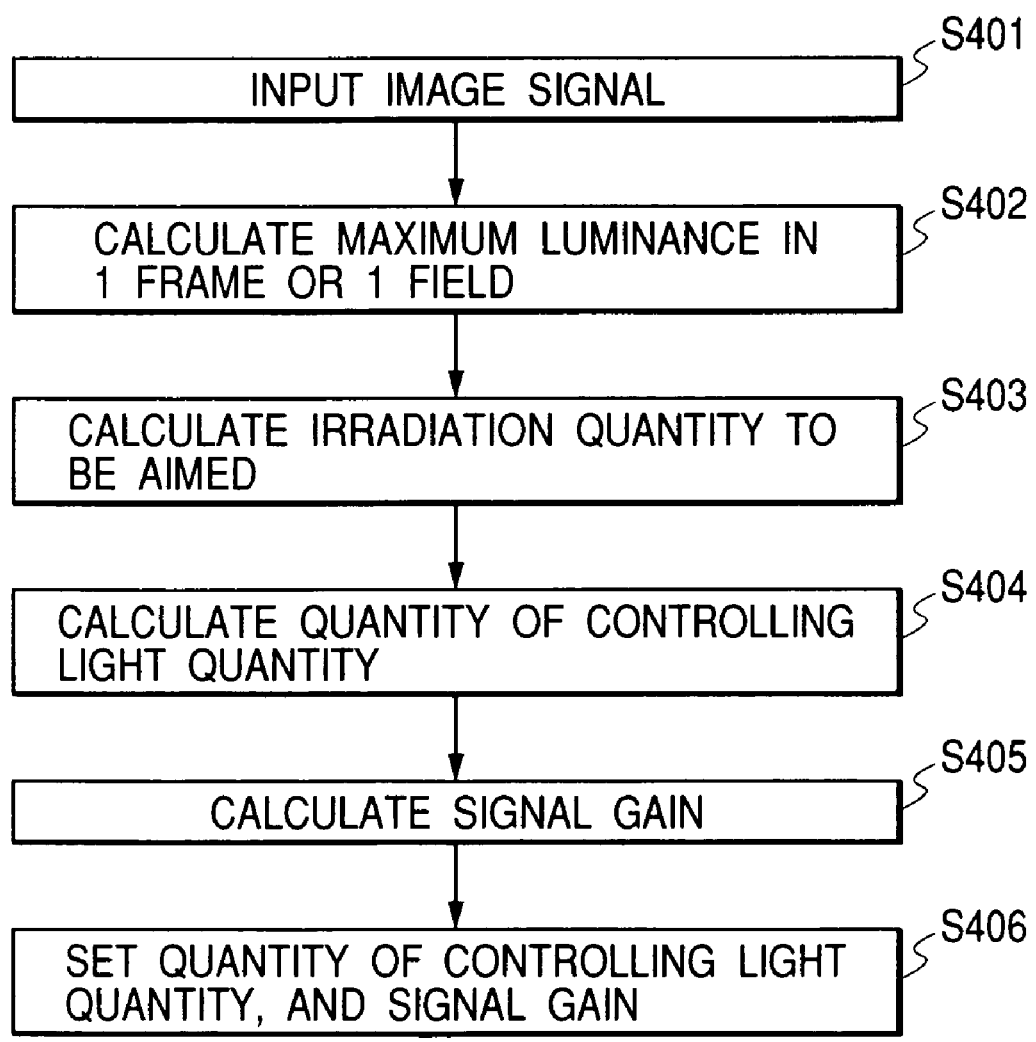
FIG. 4 is a flow chart according to the first embodiment of the present invention.

FIG. 3 is a block diagram to describe processing inside a DSP, and FIG. 4 is a flow chart.

Based on an input signal 301 inputted from an input end 301, a luminance distribution calculating unit 302 calculate the maximum luminance (S402) as described above, and based on that result, irradiation light quantity is determined by an irradiation light quantity calculating unit 303 (S403). In addition, a unit of calculating quantity of controlling light quantity 304 determines the controlling light quantity (S404). Next, a unit of calculating amplifying ratio 305 determines an amplifying ratio so as to maintain the projected display luminance (S405), and an image signal amplifying unit 306 being writing signal conversion means amplifies the input signals 301, which is outputted as output signals 307.

Incidentally, for a circuit for writing signal conversion, a multiplier may be used or a conversion table (LUT: Look Up Table) may with which conversion features can be set further in detail may be used. In addition, a dynamic range adjusting circuit already existing in an image signal processing circuit (for example the signal processing circuit 69 in FIG. 1 and the image signal processing unit 508 in FIG. 5) may be used.

Embodiment 2

In Embodiment 1, a construction using a liquid crystal panel as the light modulating element has been described, but in the present embodiment, as the light modulating element, a light modulating element, also known as a DMD, displaying images by integrating micromirrors and controlling reflecting directions of irradiation lights with respective mirrors is used. Description on portions in common with Embodiment 1 will be omitted.

Figure 5:
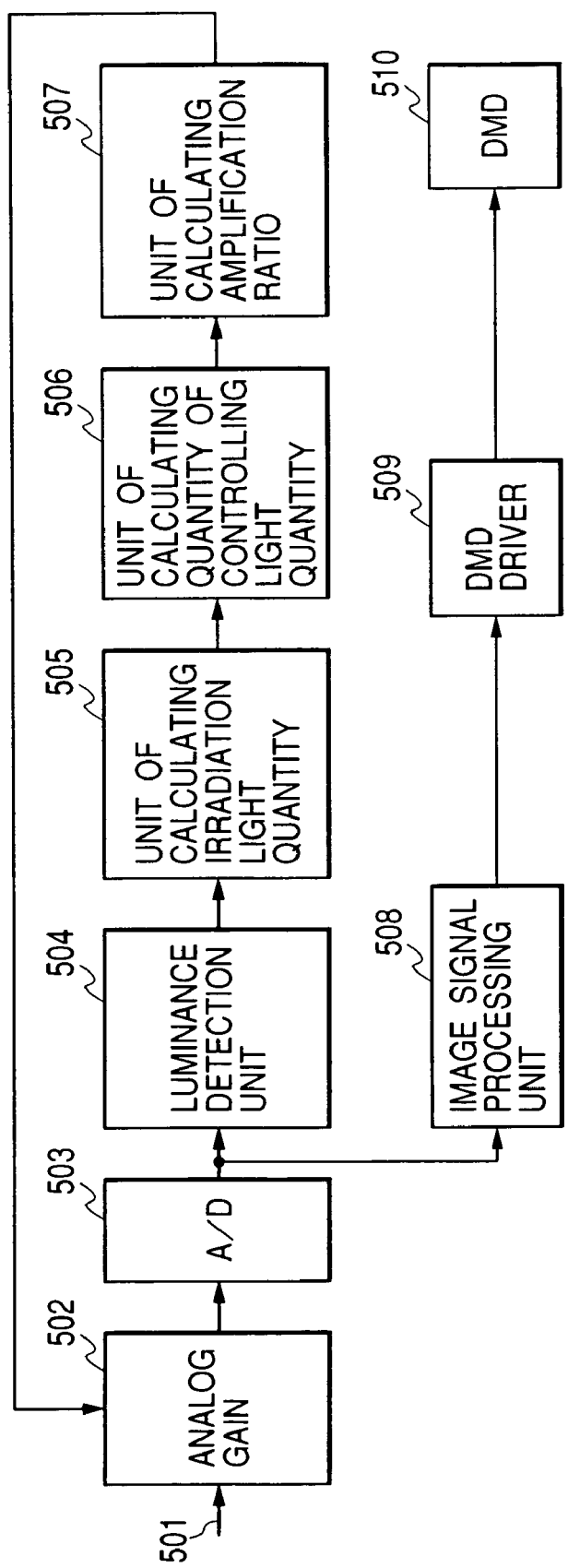
FIG. 5 is a block diagram showing a second embodiment.

FIG. 5 is a block diagram involving units of calculating quantity controlling light quantity and of signal gain setting related to a second embodiment of the present invention.

In FIG. 5, the image signals inputted from the signal input terminal 501 are amplified by an analog amplifying unit 502 constructing an adjusting circuit at an amplifying ratio calculated by a unit of calculating amplification ratio 507.

Next, subject to conversion into digital signals with an A/D converter 503, a luminance detection unit 504 constructing input image calculating means determines the maximum luminance. Incidentally, in the present embodiment, since the maximum luminance is determined after amplification, the maximum luminance is determined in consideration of an amplifying state. Corresponding with the maximum luminance, a unit of calculating irradiation light quantity 505 calculates an irradiation light quantity, and the next unit of calculating quantity of controlling light quantity 506 determines a calculating quantity of controlling light quantity. Light quantity controlling means are constructed by the unit of calculating light quantity 505 and the unit of calculating quantity of controlling light quantity 506. The amplifying ratio is given by the above described unit of calculating amplification ratio 507, and with a result thereof an amplification ratio of the above described analog amplifier is determined. The signal processing unit 508 executes respective kinds of signal processing other than irradiation light quantity controlling. Signals outputted by the signal processing unit 508 are written into a DMD panel 510 via a DMD driver circuit 509.

FIG. 5 shows the one to realize the signal gain setting unit in Embodiment 1 with an analog circuit, and to work well if it comprises an amplifier with a variable amplification ratio and an A/D converter with a variable reference voltage setting.

Moreover, a method of providing with a reference voltage is devised so that non-linear amplification will become possible and as a result thereof, gradation reproducibility will become improvable.

Amplification of image signals based on light quantity controlling at a stage of analog signals prior to undergoing conversion with an A/D converter will serve to make errors due to quantification controllable compared with Embodiment 1 and also in an image with improved dynamic range, good image quality with less deterioration in gradation will become available.

Application of the present invention to a DMD will become able to improve deterioration in image quality resembling particles due to binarization processing such as error proliferation, etc. at the side of low luminance peculiar to the DMD by way of extension of signal levels in addition to improvement in dynamic range.

In the present embodiment, a case of a DMD panel has been described, but a case of a liquid crystal panel can be done likewise.

Embodiment 3

Figure 6:
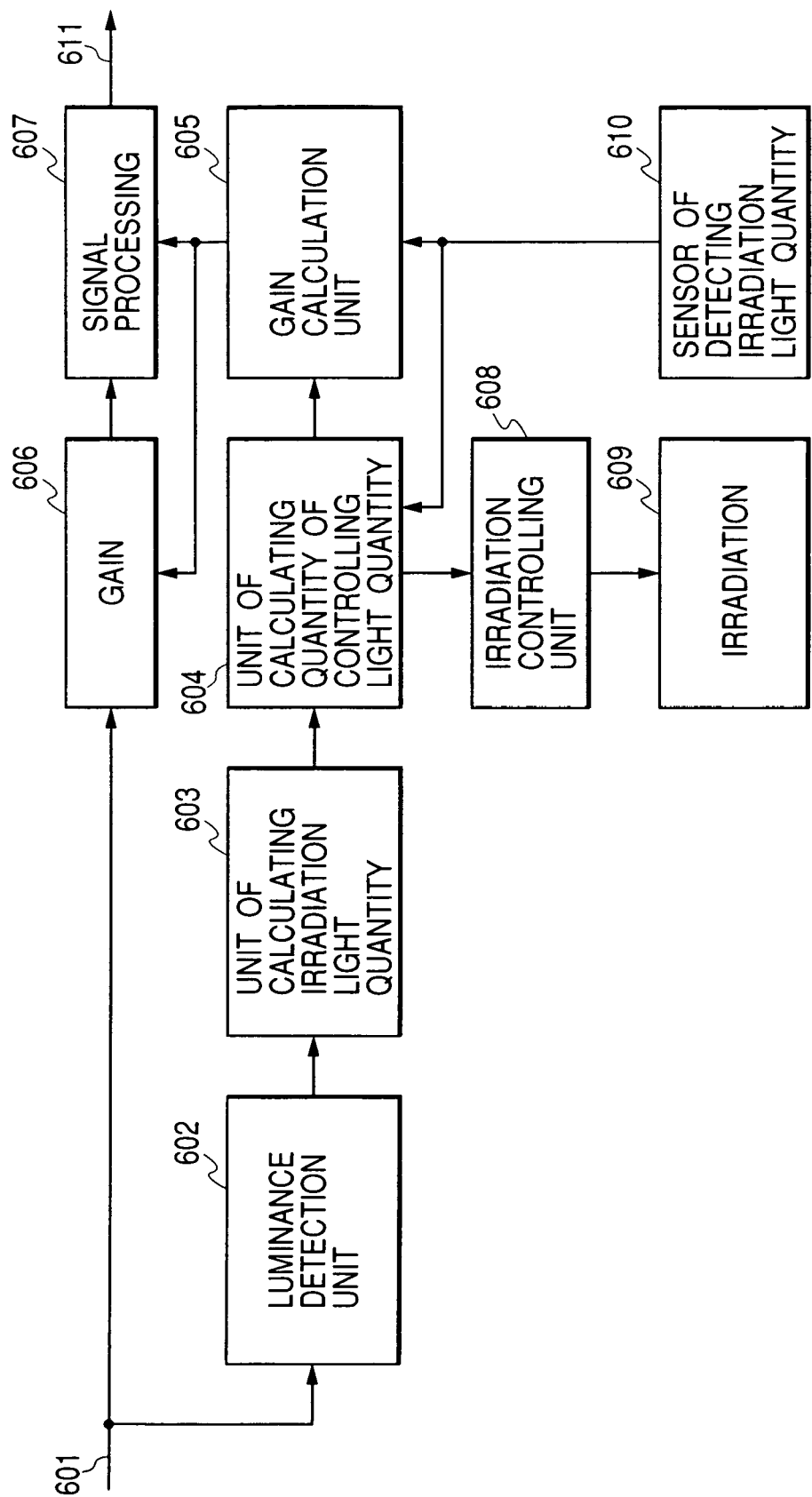
FIG. 6 is a block diagram showing a third embodiment.

FIG. 6 is a block diagram of a light quantity controlling unit and a signal gain setting unit related to a third embodiment of the present invention. In the present embodiment, light quantity controlling is executed by feeding back light quantity being illuminated to a light modulating element to a calculating unit.

In FIG. 6, based on image signals inputted from an input end 601, a luminance detection unit 602 calculates luminance distribution and a unit of calculating irradiation light quantity 603 calculates irradiation light quantity. Next, a unit of calculating quantity of controlling light quantity 604 calculates quantity of controlling light quantity and an irradiation controlling apparatus 608 drives irradiation 609.

A sensor of detecting irradiation light quantity 610 detects luminance of irradiation light 609 to be given to the unit of calculating quantity of controlling light quantity 604 as well as to the gain calculation unit 605. The gain calculation unit 605 determines gains to be written into a panel, corresponding with the irradiation light quantity to be set or the detected irradiation light quantity. Input signals 601 is inputted to the gain unit 606 which changes input-output features corresponding with coefficients determined by the gain calculation unit 605. The signal processing unit 607 executes respective kinds of signal processing and transmits image signals to a panel driving circuit (for example, the panel driver 54 in FIG. 1).

Figure 7:
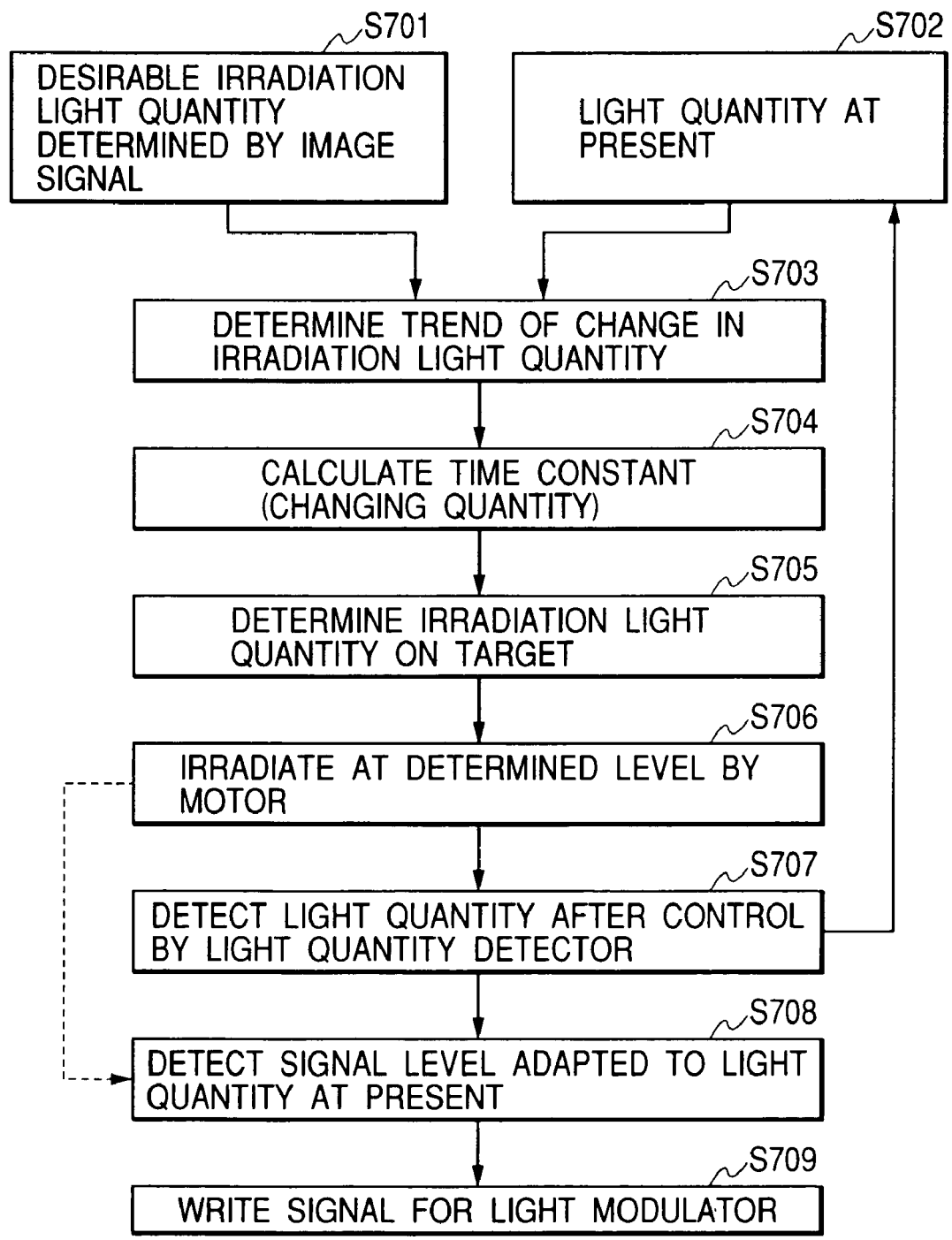
FIG. 7 is a flow chart showing a processing method of the third embodiment.

Next, with reference to a flow chart in FIG. 7, a processing/controlling method will be described.

At first, desired irradiation light quantity (S701) determined by image signals is compared with the light quantity at present (S702) obtainable from the sensor of detecting irradiation light quantity. Here, a trend of change in irradiation light quantity is determined based on whether the desired irradiation light quantity is larger or not (S703). Next, time constant calculation means calculate changing quantity per control cycle. Next, changing quantity of irradiation light quantity corresponding with respective trends is calculated (S705), and a motor is controlled corresponding with that changing quantity (S706). Next, a light quantity detector detects irradiation light quantity after control (S707) and the stage returns to S701.

The step S708 calculates a signal level appropriate to light quantity at present so as to determine amplification ratio for signals and execute conversion into signals to be written for light modulator (S709). Here, the step S703 may be executed, as shown with a broken line, based on irradiation light quantity determined at the step S706.

The sensor to detect the irradiation light is disposed, as shown in a later described embodiment, in such a position that lights inside light paths or leaked lights can be detected in order to detect lights in proportion with incident lights to the light modulator.

Here, in the case where a feedback system as the present embodiment is not used, this control flow can be used with the irradiation light quantity at present used in the step S702 being a value having been set previously in the step S707.

Here, the time constant is determined by motion velocity of a motor and a time period from supply of a control signal to the motor to completion of motion corresponding with the control signal, etc.

Accordingly to the present embodiment, with the sensor to detect the irradiation light quantity, feedback control is executed so that setting of irradiation and setting of signal amplifying ratio will become executable accurately, giving rise to an effect that luminance of the display image can be controlled stably.

In addition, in particular, the case where a motor with slow motion velocity is used or speed control for control of a motor is executed with time constants, etc. gives rise to effects.

Embodiment 4

Figure 8:
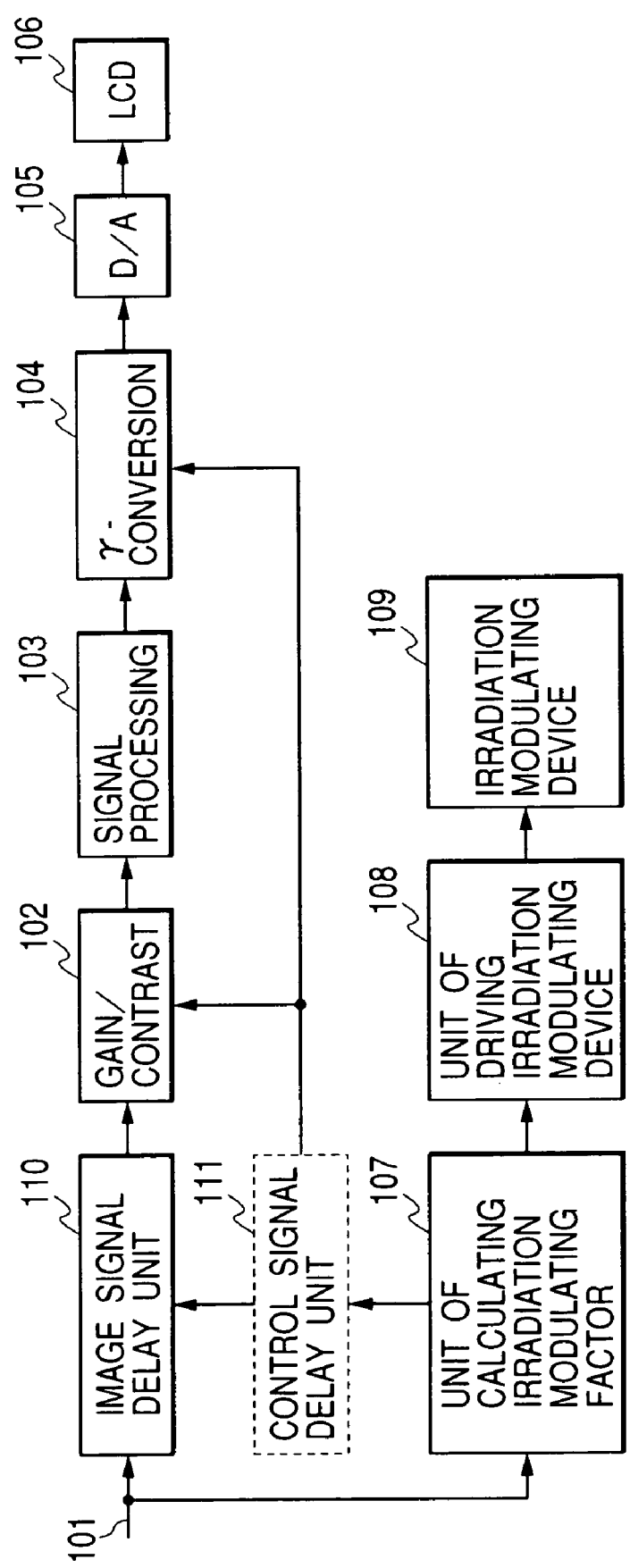
FIG. 8 is a block diagram showing a fourth embodiment.

FIG. 8 is a block construction diagram showing a display apparatus including a signal processing apparatus according to the present invention. This drawing includes portions in FIG. 1, one being equivalent to the DSP 57 and others being related to controlling in particular in the present embodiment. Incidentally, the present embodiment is arranged to execute synchronization between the display signals and the light quantity control timings with a control signal delay unit 110 separately provided apart from the memory 56 in FIG. 1. In the present embodiment, a case of irradiation light quantity to be illuminated onto the display device such as an LCD, etc. being modulated uniformly on the display device will be described.

In FIG. 8, reference numeral 101 denotes an image input terminal, reference numeral 102 denotes a gain (dynamic range) controlling unit, reference numeral 103 denotes a signal processing unit, reference numeral 104 denotes a unit of γ-conversion, reference numeral 105 denotes a D/A converter, reference numeral 106 denotes a display device such as an LCD, etc., reference numeral 107 denotes a unit of calculating irradiation modulating factor, reference numeral 108 denotes an irradiation modulating device driver and reference numeral 109 denotes an irradiation modulating device. In addition, reference numeral 110 denotes an image signal delay unit and reference numeral 111 denotes a control signal delay unit.

The image signals inputted by the image input terminal 101 are inputted to the unit of calculating irradiation modulating factor 107, where quantity of controlling light quantity to be outputted to the irradiation modulating device driver 108 as well as quantity of controlling gain to be outputted to the gain control unit or the γ-unit are calculated.

Figure 9:
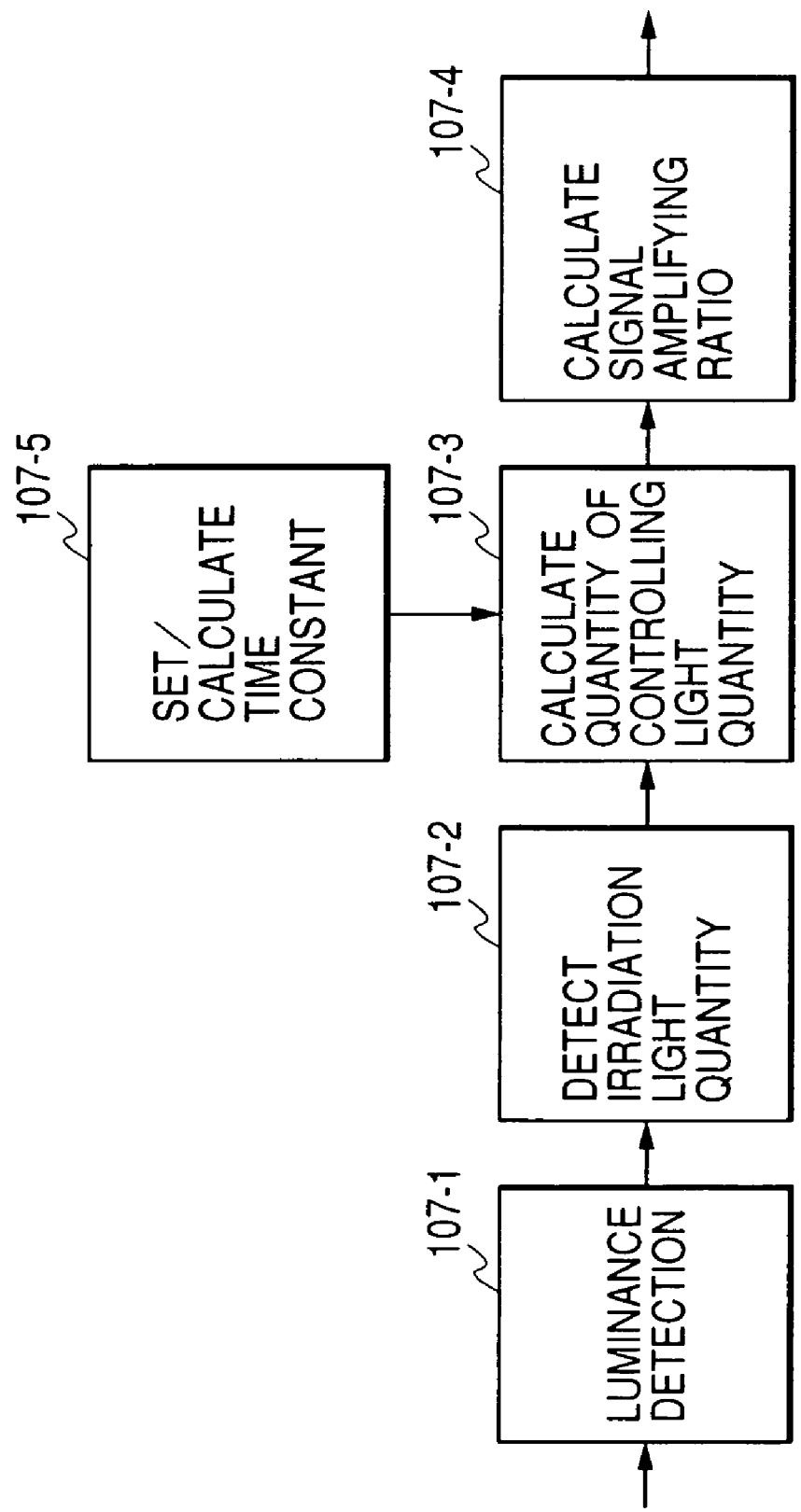
FIG. 9 is an explanatory view showing a processing flow of a unit of calculating irradiation modulating factor of a fourth embodiment.

With reference to FIG. 9, operation steps inside the unit of calculating irradiation modulating factor 107 in FIG. 8 will be described. The image signals inputted by the image input terminal 101 in FIG. 8 are inputted to the unit of calculating irradiation modulating factor 107 so that a unit of calculating luminance distribution 107-1 calculates luminance distribution. Here, as luminance distribution, maximum value, minimum value, average value and histogram, etc. of image signal data of one image plane or a plurality of image planes are calculated.

Next, a unit of detecting irradiation light quantity 107-2 calculates a light quantity value to become an aim based on a result of calculation of luminance distribution. Details on a method for calculation will be described later. In "processing flow 1" as well as "processing flow 2" to be described later, a flow using the maximum value of luminance will be described while in "processing flow 3" a method using histogram of luminance will be described.

Next, the unit of calculating quantity of controlling light quantity 107-3 calculates quantity of controlling light quantity based on the aimed light quantity value. Here, with the light quantity value to become an aim being larger than the light quantity value at present, the time constant calculation unit to be described later determines a light quantity control signal so that the light quantity increases only by a value determined in advance, and on the contrary with the light quantity value to become an aim being smaller than the light quantity value at present, a light quantity control quantity is determined so that the light quantity decreases only by a value determined in advance.

Next, the unit of calculating signal gain 107-4 determines gain as well as off setting of image signals in correspondence with the light quantity determined by the above described the above described control signal. Here, (irradiation light quantity)×(signal gain) is controlled to be always a constant so that brightness of displayed image is maintained.

The above described time constant setting unit 107-5 sets changing quantity of light quantity. Here, change rate of light quantity may be a constant, or may be changed according to a difference between a target value and the value at present, but in a trailing edge trend (a trend where irradiation light gets dark), image signals are amplified by decrease in light quantity and luminance to be displayed can be reproduced regardless of speed of control, but in a leading edge trend (a trend where irradiation light gets bright), luminance to be displayed cannot be reproduced by changing image signals if the speed to brighten the irradiation light is slow. Accordingly, in the present embodiment, the leading edge time constant is made faster than the trailing edge time constant. Thereby, rapid white display can be reproduced. Incidentally, there are a variety of methods in methods to set change rate of light quantity, but here the change rate is set in terms of changing quantity per control cycle.

Directions of leading edge and trailing edge are detected by means to detect trend of change in luminance. The change rate is set small so that phenomena resembling flickers taking place in the case where a rapid change in irradiation luminance is executed. Incidentally, according to the present embodiment, the control speed of irradiation might not be so fast in such a direction that light quantity decreases, which has turned out to result in unnatural appearance.

In addition, in the present embodiment, in order to cope with such a problem that images resemble flickering unless bright/dark trend of irradiation is stabilized to a certain degree, the threshold value to calculate irradiation light quantity from luminance information is caused to have hysteresis so that stable control is executed by changing the threshold value in the leading edge trend and the threshold value in the trailing trend (the leading side should be made larger).

In addition, there takes place a chronological discrepancy between the time when the detected image frame is displayed and the time when light quantity actually changes. In order to improve this, also in this embodiment, change in light quantity is synchronized with displayed images.

Therefore, the image signal delay unit 110 executes delay by temporally storing image signals and thereafter outputting them so as to display images used for calculation in synchronization with timing when light quantity changes.

The image signal delay unit 110 can be realized with a frame memory, etc.

In addition, instead of delaying image signals, control signals may be delayed by the control signal delay unit 111. Although delay takes place between the calculated image and the image to be controlled actually, this case can be realized with delay elements such as several flip-flops, etc. without using a frame memory, etc. at lost costs, making it possible to match a change in light quantity with a change in a display image.

An example of processing flow according to the present embodiment will be shown as follows.

In the case where the image signals are constructed with 8 bits, that input signal will be in 256 gradation of 0 to 255. Here, 0 is assigned to black and 255 is assigned to white display.

[Processing Flow 1]

(1) The maximum values RMAX, GMAX and BMAX inside 1 frame or 1 field for each of R, G and B colors are calculated.

(2) An aimed irradiation light quantity Ltg [%] will be expressed by:

$$Ltg = RGBmax/255 * 100$$

Wherein, the maximum luminance RGBmax is the largest value among RMAX, BMAX and GMAX.

Here, the actual set values for the aimed irradiation light quantity break down to 10 stages as described below and threshold values are caused to have hysteresis.

In case of a leading edge (irradiation light quantity is made bright):
RGBmax Ltg
    230 to 255→100%
    204 to 229→90%
    179 to 203→80%
    to be followed likewise In case of a trailing edge (irradiation light quantity is made dark):
RGBmax Ltg
    220 to 255→100%
    194 to 219→90%
    169 to 193→80%
    to be followed likewise (3) With Dup being changing quantity of light quantity per control cycle at the time of leading edge (dark to bright) and with Ddn being changing quantity of light quantity per control cycle at the time of trailing edge (bright to dark), The aimed irradiation light quantity and the preceding set light quantity are compared so that the set irradiation light quantity is caused to increase in the case where the aimed irradiation light quantity is greater than the preceding set light quantity. At that time, when difference between the aimed irradiation light quantity and the preceding set light quantity is larger than Dup, light quantity should not be caused to increase to reach the aimed irradiation light quantity in one control cycle, but increase in light quantity should be limited to Dup.

In addition, the aimed irradiation light quantity and the preceding set light quantity are compared so that the set irradiation light quantity is caused to decrease in the case where the aimed irradiation light quantity is smaller than the preceding set light quantity. At that time, when difference between the aimed irradiation light quantity and the preceding set light quantity is larger than Ddn, light quantity should not be caused to decrease to reach the aimed irradiation light quantity in one control cycle, but decrease in light quantity should be limited to Ddn.

An example of program to execute this control process will be expressed as follows.

[Equation 1]

```
if (aimed irradiation light quantity Ltg)>(preceding set
light quantity Lw(n−1)) then
        if((Ltg−Lw(n−1))>Dup)then
                set irradiation light quantity Lw(n)=Lw(n−1)+Dup
        else
                Lw(n)=Ltg
        end if
    else
        if((Lw(n−1)−Ltg)>Ddn) then
                set irradiation light quantity Lw(n)=Lw(n−1)+Ddn
        else
                Lw(n)=Ltg
        end if
end if
```

(4) Setting of a pulse motor as well as setting of a signal gain corresponding with the set irradiation light quantity is executed in synchronization with vertical synchronization signal VD.

(5) The above described (1), (2), (3) and (4) are repeated in every $\Delta T$ time.

Here, $\Delta T$ depends on motion speed of the means to control light quantity, and here on motion speed of the motor to rotate the polarizing plate to change light quantity, but for this processing flow, with a motor having sufficient speed, one frame interval is taken as a control cycle. In addition, in the case where one frame is constructed with a plurality of fields, a field interval is preferably taken.

[Processing flow 2]

In addition, in the case where motion speed of the motor is slower compared with the frame rate, the following flow may be used to realize light quantity control effectively.

(1) The same as the above described processing flow 1.
(2) The same as the above described processing flow 1.
(3) The set light quantity Lw(n)=Ltg
(4) Setting of the pulse motor is set corresponding with the set light quantity.

Here, as for setting of the signal gain, setting is repeated linearly to reach the aimed value in correspondence with change in irradiation light quantity, in synchronization with VD, during the period when the pulse motor reaches the set value.

(5) After the pulse motor reaches the set value, the above described (1), (2), (3), and (4) are repeated.

As described so far, also in the case where motion speed of the motor is slow, display luminance will become maintainable constantly.

[Processing flow 3]

A processing method with histogram of luminance distribution will be described.

(1) An input signal is divided into n units with threshold values $A0$ to $A(n-1)$ of the comparator, and the number of signals within respective ranges are counted so that luminance distribution is created. The n-divided count number should be $C0$ to $Cn$ respectively. Here, $A(n-1)>A(n-2)>\ldots>A0$.

(2) Next, the light quantity value to become an aim is calculated by judging whether or not the number is more than a predetermined number sequentially in an order of luminance intensity from a range with large value.

Here the actual set value is caused to have hysteresis in the threshold value with the aimed irradiation light quantity consisting of 10 stages as described below.

In case of a leading edge (irradiation light quantity is made bright):

[Equation 2]

```
if (Cn>(100+ΔH)) then
        aimed irradiation light quantity Ltg<=100%
    elsif ((C(n)+C(n−1))>(100+ΔH)) then
        aimed irradiation light quantity Ltg<=90%
    elsif ((C(n)+C(n−1)+C(n−2))>(100+ΔH)) then
        aimed irradiation light quantity Ltg<=80%
    to be followed likewise.
```

In case of a trailing edge (irradiation light quantity is made bright):

[Equation 3]

```
if (Cn>100) then
        aimed irradiation light quantity Ltg<=100%
    elsif ((C(n)+C(n−1))>100) then
        aimed irradiation light quantity Ltg<=90%
    elsif ((C(n)+C(n−1)+C(n−2))>100) then
        aimed irradiation light quantity Ltg<=80%
    to be followed likewise.
```

Here, comparative value as well as hysteresis quantity ΔH may be changed every count value executing comparison.
(3) The same as the above described processing flow 1 or 2.
(4) The same as the above described processing flow 1 or 2.
(5) The same as the above described processing flow 1 or 2.

As described so far, according to the present embodiment, the aimed irradiation light quantity is divided into n units, and the threshold value being a judgment value for determining the irradiation light quantity is caused to have hysteresis with the control trend of irradiation light quantity so that the phenomena causing changes in irradiation light quantity to occur frequently in the vicinity of the threshold value may disappear, enabling stable images to become available and improving image quality further.

In addition, the time constant setting unit is provided with function of controlling time base changing quantity, in particular, a function to adjust time to practically create changes in light quantity per control cycle so that velocity of changes in light quantity toward a lamp can be controlled (limited), making suitable display realizable.

In addition, irradiation control means with motion speed being slow can be used and are advantageous in terms of costs.

In addition, phenomena like flickers will become controllable.

Thus, according to levels (distribution, features) of inputted image signals, irradiation light quantity is made variable, and means to convert gains or voltage-luminance feature of image signals in correspondence with the irradiation light quantity are provided so that it becomes possible to improve dynamic range while keeping the displayed luminance.

[Embodiment 5]

Next, a fifth embodiment of the present invention will be described.

Figure 10:
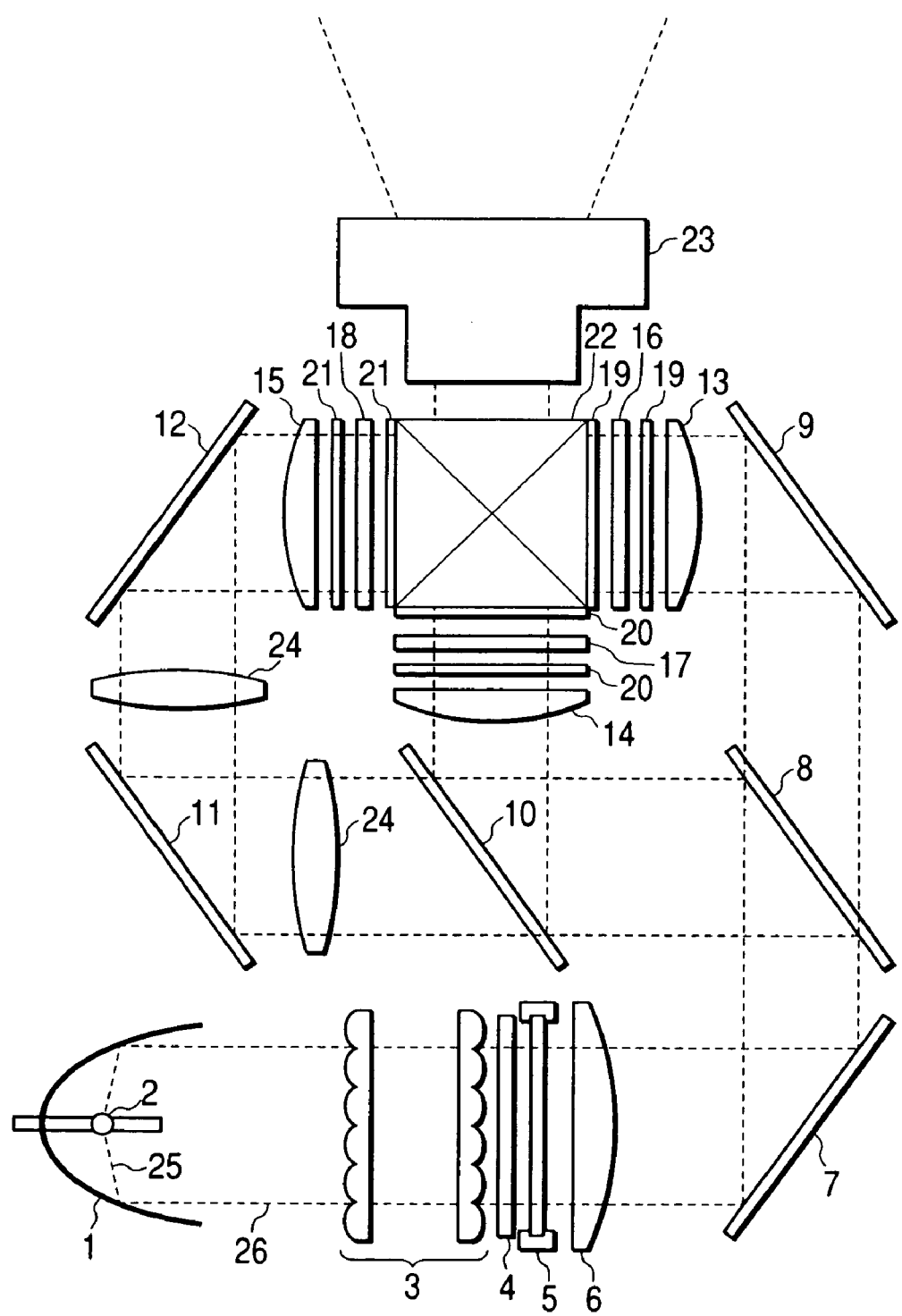
FIG. 10 is a schematic view showing a construction of an optical system for a liquid crystal projector related to a fifth embodiment of the present invention.

FIG. 10 is a schematic view showing a construction of an optical system of a liquid crystal projector related to the fifth embodiment of the present invention, in which reference numeral 1 denotes a reflector for a lamp, reference numeral 2 denotes an arc tube (lamp), reference numeral 3 denotes a fly-eye integrator, reference numeral 4 denotes a PS conversion optical element and reference numeral 5 denotes a irradiation light quantity modulator. In the irradiation light quantity modulator 5, a phase plate or a polarizing plate is attached to a ultrasonic motor. Reference numerals 6 and 24 denote relay lenses, reference numerals 7, 9, 11 and 12 denote mirrors, reference numerals 8 and 10 denote a dichroic mirror, reference numerals 13, 14 and 15 denote field lenses, reference numerals 16, 17 and 18 denote liquid crystal panels, reference numerals 19, 20 and 21 denote polarizing plates, reference numeral 22 denotes a cross prism and reference numeral 23 denotes a projection lens.

A principle on how irradiation light quantity to the liquid crystal panels 16, 17 and 18 is modulated will be described with reference to FIG. 10. The light fluxes 25 emitted from the lamp 2 are reflected by the reflector 1 to become parallel light fluxes 26. In the present embodiment, the shape of the reflector 1 is parabolic, converting lights into parallel light fluxes, but it goes without saying that the shape of the reflector is made oval, converting lights into a condensed light flux. The above described light flux 26 is emitted into the fly-eye integrator 3, and respective fly-eye lenses 3a in the incident side keeps cooperative relationship with the liquid crystal panels. This integrator 3 serves to unify distribution of light flux emitted from the lamp 2, and, in addition, to simultaneously unify color distribution for respective light emitting areas of the lamp 2.

The light flux emitted from the integrator 3 is non-polarized light flux and is converted into a linear polarized flight flux with the PS conversion element 4. As these PS conversion elements, those constructed by polarized beam splitters and 1/2-wavelength plates can be used. The case of this system sufficiently gives rise to the ratio of P light and S light of not less than 20:1.

When this linearly polarized light flux passes by the optical element 5 constructed to rotate the polarized plate or the phase plate continually, the irradiation light quantity to the liquid crystal panels continually changes.

In the case where a polarizing plate is used for the optical element 5, light quantity (approximately 85%) with exclusion of approximately 15% being an absorbed surface reflection component with the polarizing plate when the linear polarizing trend after passing the above described PS conversion element 4 and the polarizer trend of the polarizing plate are disposed in parallel.

When the polarizing plate is rotated toward the polarizing trend of the above described linear polarized light flux, only projecting component toward the trend of polarizer of the polarizing plate is transmitted so that light quantity can be reduced continually. In the case where the PS ratio of the linearly polarized light flux emitted into the above described optical element 5 is 20:1, irradiation light quantity to the panels could be changed to 1/20.

As described above, after passing the PS conversion element 4, the light flux is converted into linearly polarized light (could be partially linear conversion), and thereafter the polarizing plate through which the linearly polarized light passes is rotated so that the irradiation light quantity onto the panel can be changed. This polarizing plate may basically be disposed anywhere after the PS conversion, but is desirably disposed apart from the light source since light quantity is so intensive when it is disposed near the source that the polarizing plate itself changes in quality. In addition, in the case where it is difficult to dispose it apart from the light source, a polarizing plate made of sapphire can be used to improve its light-resistant and heat-resistant nature.

The above described polarizing plate is rotated with an ultrasonic motor. The ultrasonic motor (USM) is well controlled at a high speed and in terms of rotary angle, and is suitable for light quantity adjustment for the present objective.

For rotation speed of the ultrasonic motor, which depends on load torque, nevertheless 1000 to 5000 rpm is sufficiently attainable, and with rotary angle of 90° (equivalent to white-to-black conversion), irradiation light quantity can be changed in 3 to 15 ms. Image signals scarcely change from white to black rapidly, and with light quantity change of 10%, a necessary rotary angle is 26° and the irradiation light quantity change speed in that case is 1 to 5 ms, being faster than the response speed 10 to 20 ms of liquid crystal. As for rotary accuracy, rotary angle can be controlled with an encoder mounted on the motor and sufficient accuracy within a range of ±0.1° has been obtained.

As a motor, besides the ultrasonic motor, equivalent speed and accuracy is realizable with a stepping motor.

The above described example is a system in which later-described desired irradiation light quantity is calculated from image signals, and a rotary angle of polarizing plate for realizing that determined irradiation light quantity is calculated to operate the motor so as to provide that rotary angle.

Next, a system in which the irradiation light quantity itself is monitored, undergoes servo to be controlled to a desired light quantity will be described with reference to FIG. 11. An optical system in FIG. 11 excludes the mirror 7 for the one in FIG. 10 which has been replaced with a half mirror 1101, and adds thereto a condenser 1102 to condense lights having transmitted through the half mirror 1101 and light quantity detector 1103 to detect that light quantity. The half mirror 1101 may be constructed to be approximately reflexive with reflecting component of 99% and penetrating component of 1%. Accordingly, irradiation light quantity to the panels drops slightly with this half mirror, which however is not a level to become a problem. Penetrating light flux from the half mirror 1101 enters the light quantity detector 1103 via the condenser 1102.

A method to control irradiation light quantity to the panels in the optical system in FIG. 11 will be described with reference to a flow chart in FIG. 12. The subsequent irradiation light quantity is determined to be set at which level based on the irradiation light quantity calculated from image signals and the irradiation light quantity at present. The irradiation light quantity at present is taken into consideration, because even if luminance levels change rapidly from white to black due to change of scene, the change should not be kept up with rapidly, and moderate change at several fields to several tens of fields had better be taken to easily execute operations and the like on the liquid crystal panels, etc., which are visible to human eyes without causing any uncomfortable feeling, and are adaptable to such cases.

After the above described level of irradiation light quantity is determined, the motor is rotated so as to provide with that irradiation level so that actual light quantity after control is measured with the light quantity detector 1103. Due to the light which is condensed by the condenser 1102, the detector which itself is a small sized pin type one will work sufficiently, and can detect light quantity in several 10 µs in combination with a rapid amplifier. If the motor is controlled to make this light quantity to reach a desired level, irradiation with constant light quantity is realized and a stable image plane is realized even if change in light quantity takes place in the lamp itself. In particular, in case of using a very high pressure mercury lamp and a metal halide lamp being effective to make a project engine smaller and having arc length being short with 1 to 1.3 mm, movement of the emission area of the lamp 2 could give rise to change in light quantity emitted into the integrator 3 and change in practical irradiation light quantity to the panels, resulting in deteriorating display performance, and settlement on that has been demanded, and now that can be dealt with effectively and display performance can be advantageously improved.

In addition, signals corresponding with actually detected light quantity are calculated to be written in the liquid crystal panels, etc., enabling such operation that switches irradiation light slowly for change in image from white to black and fast for change from black to white. This serves to secure a peak luminance of white for change from black to white, giving rise to advantages that not only display performance is improved but also load on the motor is reduced, consumed power saving becomes possible and life of the motor is extended.

Here, an ultrasonic motor is used to rotate the polarizing plate to execute irradiation light quantity control that is rapid, without any backlash, and is excellent in calmness. However, it goes without saying that another motor other than the ultrasonic motor is usable.

The above described construction controlled irradiation light quantity with rotation of the polarizing plate, but instead of this polarizing plate, uses a phase plate which gives rise to few light quantity losses and is suitable as a high luminance projector. As the phase plate, a λ/2 plate is adopted so that the phase of the linear polarized light flux after passing the λ/2 plate rotates by 2θ in correspondence with the rotary angle θ of the λ/2 plate toward a linear polarized light flux emitted from the PS conversion element 4. Accordingly, the rotary angle of the λ/2 plate may be a half toward the polarizing plate, enabling more rapid light quantity modulation. The light quantity of the rotated polarized light flux suffers from loss with the phase plate is 2 to 3% at most, and is excellent in providing with high luminance. The polarizing plate preceding the liquid crystal panel illuminates only that inclined projection component to the liquid crystal panels, and thus irradiation light quantity can be modulated.

Figure 11:
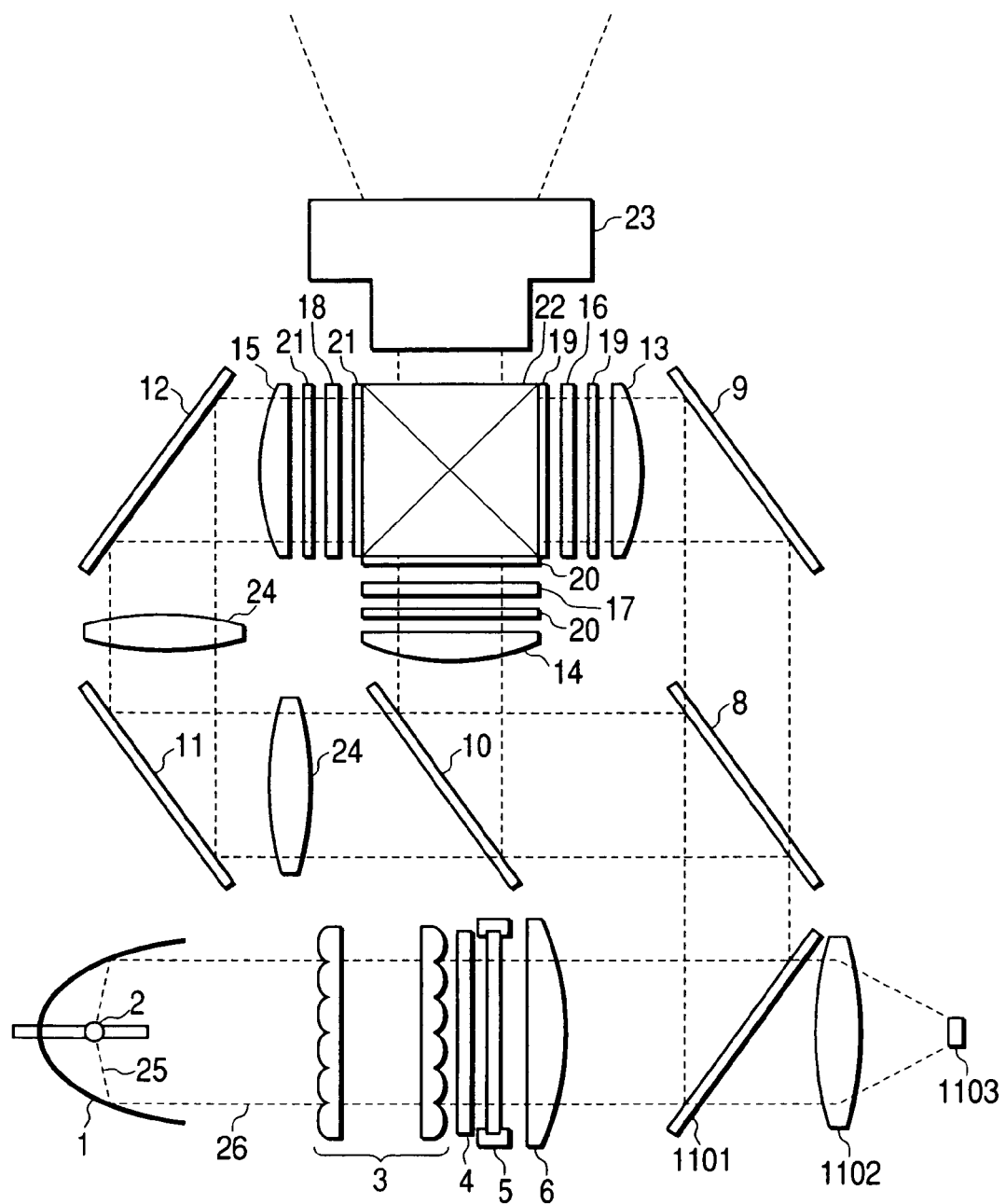
FIG. 11 is a schematic view showing a variation of the light modulator portion in FIG. 10.
Figure 12:
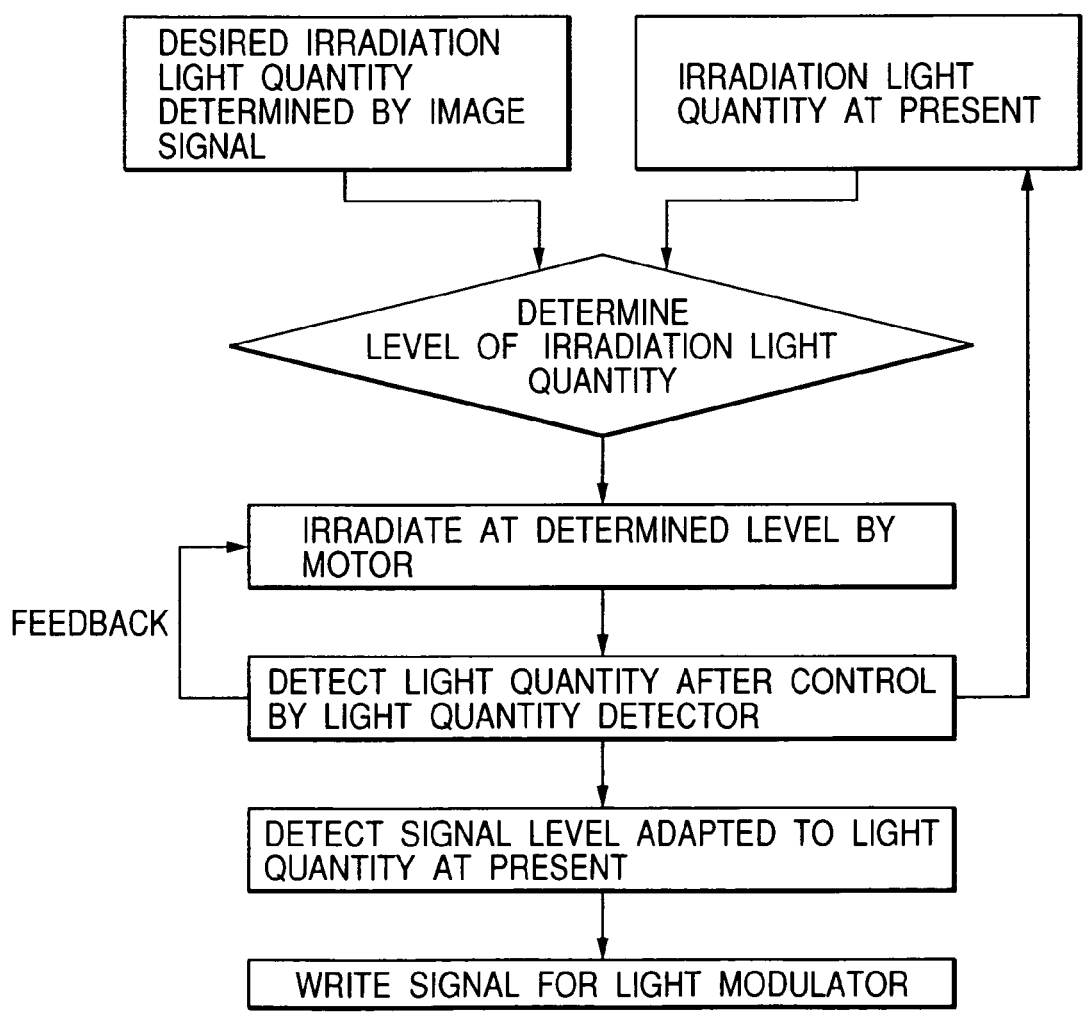
FIG. 12 is a flow chart showing operation of the light modulator in FIG. 11.

In the optical system in FIG. 10 and FIG. 11, the light flux having transmitted through the optical element for irradiation light quantity modulation (irradiation light quantity modulator) 5 is illuminated to the liquid crystal panels for respective color via relay lenses 6 and 24. The dichroic mirror 8 transmits the blue color but reflects others. The dichroic mirror 10 transmits the red color and reflects the green color. In this case, reference numeral 16 denotes the liquid crystal panel for the blue color, reference numeral 17 denotes the liquid crystal panel for the green color and reference numeral 18 denotes the liquid crystal panel for the red color, which is for example a TN liquid crystal panel to be driven with a TFT. Moreover, as concerns the one with micro lenses for respective pixels, shading of lights at the opening decreases and provision of high luminance has been planned.

Accompanied by irradiation light quantity conversion, a new method is adopted also for driving the above described liquid crystal panels. This driving method will be described later. The light fluxes for respective colors subject to modulation with the respective color liquid crystal panels are synthesized with the cross prism 22 and are shown on image plane via the projection lens 23.

[Embodiment 6]

Figure 13:
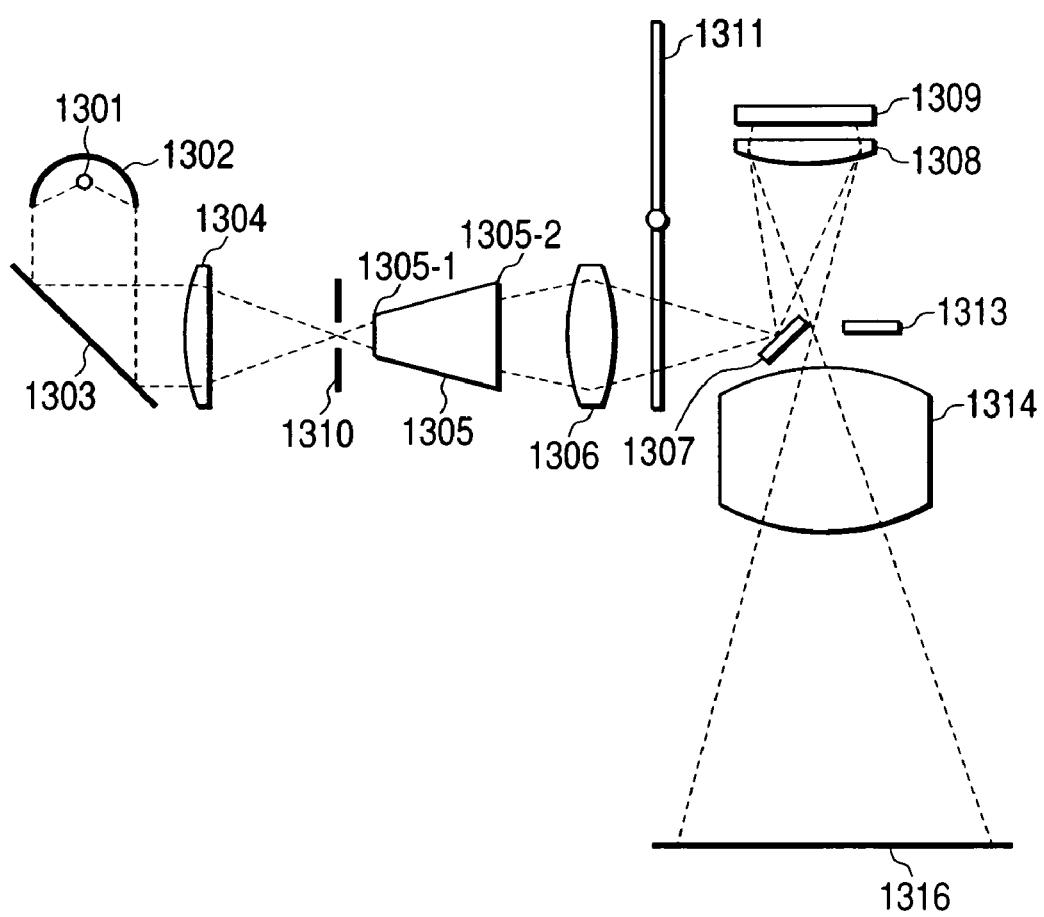
FIG. 13 is a construction view showing an optical system of a DMD projector related to a sixth embodiment of the present invention.

FIG. 13 is a schematic view showing a sixth embodiment of the present invention. In FIG. 13, lights emitted from a light source 1301 such as a metal halide lamp and a xenon lamp, ext. are made to go approximately in parallel with the parabolic reflector 1302 and subject to reflection on the mirror 1303, and form a light source image in the position of the front end surface (a first end surface) 1305-1 of the integrator 1305 via the condenser 1304. In the vicinity of this light source image, a diaphragm indicated by 1310 is provided. When the diaphragm 1310 is restricted, incident light quantity for the integrator 1305 can be decreased. In the light flux emitted into the integrator 105, a portion transmitted through the integrator and a portion of the remaining portion is emitted from the rear end surface (a second end surface) 1305-2 subject to one to several reflections on the internal reflection surface.

It is advisable that a parabolic reflector 1302 and a condenser 1304 fulfilling $4 \leq F4/F3 \leq 10$, (where F3 is distance from the bottom surface of the above described parabolic reflector to the above described focus) with F3 being the focal distance of the parabolic reflector 1302 and F4 being the focal distance of the condenser 1304. The reason thereof is that a small light source image can be formed in the front end surface position 1305-1 of the integrator 1305. The light flux from the integrator 1305 is emitted into the convex lens 1306, transmitted therethrough the dichroic filter 1311 which only RGB or RGBW lights transmitted therethrough, and forms the image of the light source 1301 in the vicinity of the reflection mirror 1307. The above described dichroic filter is exemplified by a penetration type, but it goes without saying that a reflection type is effectively used. The reflection mirror 1307 is disposed in a position of the opening diaphragm 1313 of the projection lens 1314.

In FIG. 13, the light flux from the integrator 1305 is reflected by the reflection mirror 1307 and is emitted to a plane convex lens 1308 so as to be made to become approximately parallel lights with the plane convex lens 1308 and to illuminate the DMD panel 1309 being a light modulator. The DMD panel 1309 forms image information by light modulation such as scattering or non-scattering of incident lights for each pixel corresponding with image signals. The liquid crystal display panel of the above described fifth embodiment has similar construction and functions, and as necessity arises an liquid crystal display panel of another type can be used.

An important point in the optical system of the present embodiment is that a convex lens 1306 being the rear end surface of the integrator 1305 and the plane convex lens 1308 form an image on the DMD panel 1309. In the rear end surface 1305-2 of the integrator 1305, the light flux penetrating inside the integrator 1305 without any reflection and the light fluxes subject to one or several reflections are overlapped, and thereby unevenness in color and unevenness in luminance does not take place to give rise to approximately uniform light intensity distribution. Accordingly, if this rear end surface 1305-2 is brought into cooperative relationship with the display surface of the DMD panel 1309 by way of the convex lens 1306 and the plane convex lens 1308, display surface of the DMD panel alleviate unevenness in color and unevenness in luminance and as a result thereof, unevenness in color and unevenness in luminance of images displayed on the image plane 1315 are alleviated. In addition, the shape of the rear end surface 1305-2 of the integrator 1305 is made to be a rectangular approximately similar in shape with the display surface of the DMD panel 1309 so that the rear end surface 1305-2 of the integrator 1305 is made to form an image on the DMD panel 1309 at an appropriate magnifying ratio to illuminate the panel efficiently.

Incidentally, in FIG. 13, the lens 1304, the lens 1306 and the lens 1308 are respectively one lenses, but these lens system can be constructed by a plurality of lenses respectively. Respective lenses of the above described embodiments are constructed likewise. Accordingly, the term referred to as "convex lens" in the present application is a lens system having positive refraction force.

With the DMD panel 1309, the reflection lights of respective colors modulated corresponding with image signals are condensed by the plane convex lens 1308, and at least a portion of the flux passes the opening of the opening diaphragm 1313 and is projected on the image plane 1315 via the projection lens 1314. At this time, in the opening of the diaphragm 1313, a light source image similar in shape with the light source image is formed with the light subject to regular reflection by the DMD panel 1309. The reason hereof is that the light source 1301, the front end surface 1305-1 of the integrator 1305, the reflection mirror 1307 and the opening diaphragm 1313 are disposed in a cooperative positions each other. The optical system consisting of the projection lens 1314 and the condenser 1308 is a system that is telecentric in the DMD panel side.

The present embodiment is a system to display RGB with time division by way of rotation of the dichroic filter 1311 shown in FIG. 13, and the diaphragm 1310 for light quantity adjustment is modulated in synchronization with one rotation so that luminance modulation similar to the fifth embodiment can be executed. In addition, the diaphragm 1310 is adjusted in synchronization with respective color levels of the RGB time division so that irradiation light quantity can be also modulated.

The present construction is advantageous in costing little either to execute irradiation light quantity modulation to provide the high dynamic range DMD with further highly dynamic range high image quality.

The above described embodiment has been exemplified by the DMD panel, but it goes without saying that the liquid crystal panels are effective in this respect.

[Embodiment 7]

Figures 14, 14A:
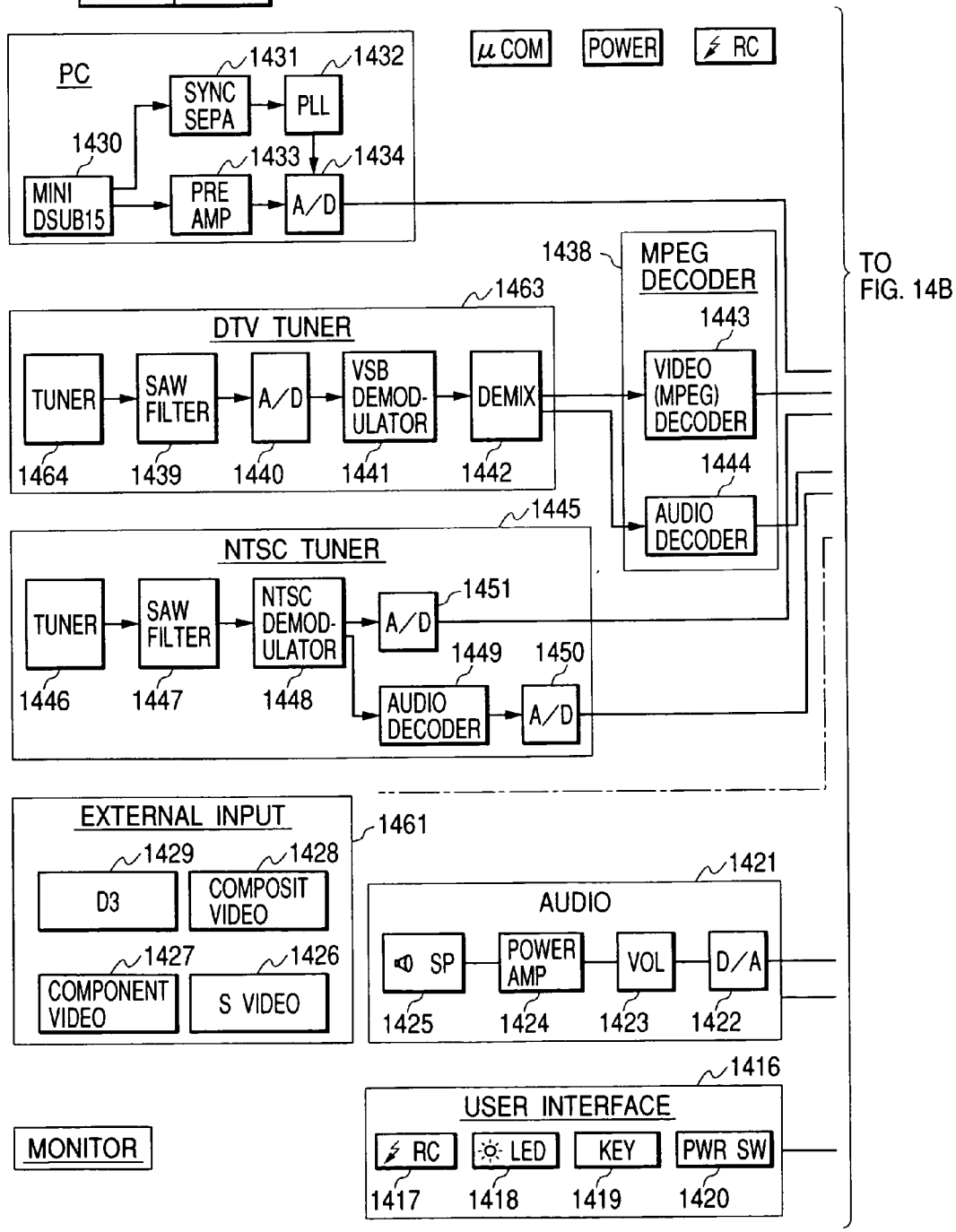
FIG. 14, composed of FIGS. 14A and 14B, is a block diagram showing a construction of a electric system of a DMD projector related to a seventh embodiment of the present invention.
Figure 14B:
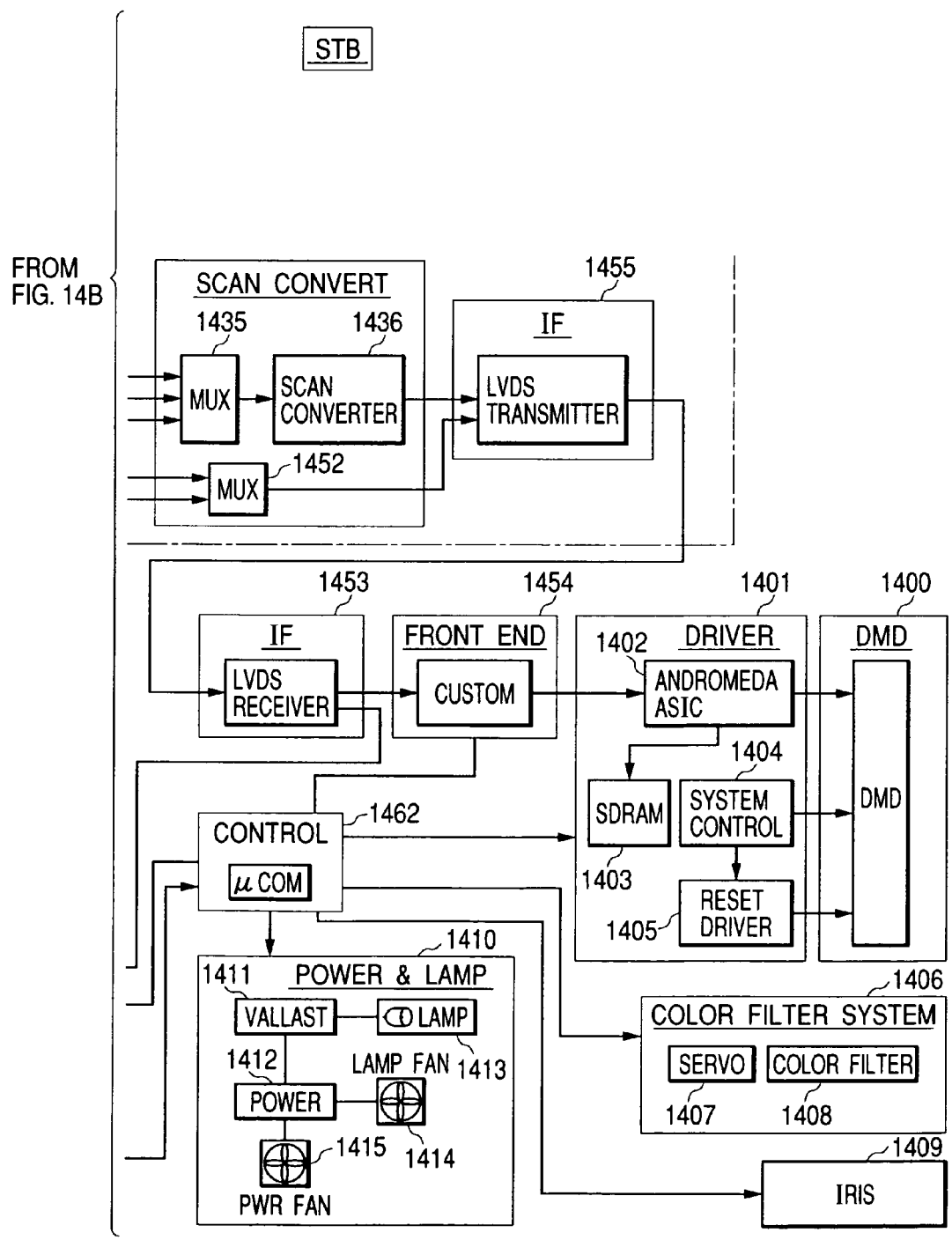

FIGS. 14A and 14B are block diagrams showing an electric system related to a seventh embodiment of the present invention. In FIGS. 14A and 14B, reference numeral 1400 denotes a DMD and reference numeral 1401 denotes a DMD driver unit. The driver unit 1401 comprises internally a unit 1402 of signal conversion processing such as time division, etc., a memory 1403, a control unit 1404 and a reset driver 1405.

Coupled with signal processing, there is a color filter system 1406 (corresponding to 1311 in FIG. 13), which is constituted by control on rotation synchronization and servo 1407 as well as the color filter 1408 itself.

The diaphragm 1409, the power source unit 1410 and the DMD driver unit 1401 are connected with the micro computer 1462 and are controlled in their entirety.

The power source unit 1410 consists of the ballast 1411, the power source 1412, the lamp 1413, the lamp fan 1414 and the fan for cooling the power source and the electronic substrate 1415. In addition, a user interface unit 1416 comprising a remote controller and buttons is constructed by the remote controller 1417, the LED 1418 to emit lights from the remote controller, buttons and keys 1419, and switches 1420.

The acoustic system 1421 comprises a DA unit 1422 to DA convert output signals of digital signals 1/F such as LVDS and TMDS, a volume (VOL) adjusting circuit 1423, an amplifier 1424 and speakers 1425.

As a monitoring function 1461, an S terminal 1426, a component video terminal 1427, a composite video terminal 1428 and a terminal for digital broadcasting (D3) 1429, etc. are provided.

On the other hand, analog signals from the PC are inputted from the Dsub 15 pins 1430; converted into digital signals at the AD converter 1434 via phase adjustment 1431, PLL 1432 and the preamplifier 1433; and enter a scan converter 1436 via a multiplexer 1435.

In addition, signals for DTV enter the scan converter 1436 via a tuner unit 1437 and an MPEG decoder 1438. Normal NTSC signals are inputted via the scan converter 1436 after AD conversion in the AD converter 1451. In addition, audio signals separated from signals for DTV and NTSC signals enter the transmission unit 1455 of an LVDS interface via a multiplexer 1452. Video signals from the scan converter 1436 and audio signals from the multiplexer 1452 enter a front end 1454 and an acoustic system 1421 via the transmission unit 1455 of the LVDS interface and the receiver unit 1453. Output signals of the front end 1454 enter the DMD driver unit 1401.

The present construction not only makes high image quality available for a front projector and a rear projector for office use but also is applicable to rear or front TVs with large image planes for consumer use, home theaters and mini theaters, etc.

In FIGS. 14A and 14B, the DTV tuner unit 1463 comprises a tuner 1464, an SAW filter 1439, an AD converter 1440, a VSB demodulator 1441 and a demixer 1442. An MPEG decoder 1438 comprises a video decoder 1443 and an audio decoder 1444. An NTSC tuner 1445 comprises a tuner 1446, an SAW filter 1447, an NTSC demodulator 1448, an audio decoder 1449 and an AD converter 1450.

As described so far, according to the embodiment of the present invention, the irradiation light quantity control means are provided to adjust light quantity illuminated to the light modulator so that a dark image plane can be illuminated with low light quantity while a bright image plane can be illuminated with high light quantity, and as a result, contrast higher than in the case of irradiating the light modulator at a constant light quantity can be realized.

According to the embodiment of the present invention, the irradiation light quantity modulating means have been provided between the light source and the light modulator so that a dark image plane can be illuminated with low light quantity while a bright image plane can be illuminated with high light quantity, and as a result, contrast higher than in the case of irradiating the light modulator at a constant light quantity can be realized.

According to the embodiment of the present invention, the irradiation light quantity modulating means have been provided to directly control the light source emitting lights to be illuminated to the light modulator so that a dark image plane can be illuminated with low light quantity while a bright image plane can be illuminated with high light quantity, and as a result, contrast higher than in the case of irradiating the light modulator at a constant light quantity can be realized.

According to the embodiment of the present invention, light quantity is controlled to keep relationship approximately in inverse proportion to signal amplifying ratio so that high contrast can be realized while display luminance in an intermediate gradation is kept at a constant.

As described in the embodiments in particular so far, according to the invention of the present application, image display with high image quality can be realized.

What is claimed is:

1. A display apparatus for forming a display image comprising:
    a light source;
    a light modulating element for modulating light irradiated from said light source;
    input image calculating means for performing a predetermined calculation according to an input display signal; and
    light quantity controlling means for increasing or decreasing a light quantity irradiated onto said light modulating element step by step according to a value determined by said calculation,
    wherein a first threshold value at which said light quantity controlling means increases the light quantity from a first stage being a predetermined stage into a second stage increased therefrom by one step according to the value determined by said calculation is different from a second threshold value at which said light quantity controlling means decreases the light quantity from the second stage into a stage of smaller light quantity.

2. The display apparatus according to claim 1, wherein said light quantity controlling means is set so as to increase said light quantity from said first stage to said second stage when the value determined by said calculation changes in a first direction to exceed the first threshold value, and so as to decrease said light quantity from said second stage to the stage of smaller light quantity when the value determined by said calculation changes in a second direction, opposite said first direction, to exceed the second threshold value in the second direction opposite to said first threshold value.

3. The display apparatus according to claim 2, wherein the stage of smaller light quantity is said first stage.

4. The display apparatus according to claim 1, further comprising an adjusting circuit for adjusting display signal according to a result of the calculation.

5. The display apparatus according to claim 1, wherein said calculation is calculation to give maximum luminance in said display signals inputted within a predetermined period.

6. The display apparatus according to claim 1, wherein said calculation is calculation to give a number of data exceeding a predetermined luminance among luminance data included in said display signals inputted within a predetermined period include.

7. The display apparatus according to claim 1, further comprising sensors for detecting light quantity irradiated onto said light modulating element, wherein said light quantity controlling means controls the light quantity based on the calculation results and a detection results by said sensors.

8. The display apparatus according to claim 1, comprising an adjusting circuit for adjusting display signal according to said calculation result, and a sensor for detecting light quantity irradiated onto said light modulating element, wherein said adjusting circuit performing the adjustment according to the calculation result and the detection result by said sensor.

9. The display apparatus according to claim 1, comprising means for setting quantity of changing irradiation light quantity, so as to set changing quantity or change rate of said irradiating light quantity.

10. The display apparatus according to claim 9, wherein said change rate is greater in a trend to increase irradiation light quantity than in a trend to decrease irradiation light quantity.

11. The display apparatus according to claim 1, wherein said light quantity controlling means are means to be disposed between said light source and said light modulating element to control light quantity to be irradiated onto said light modulating element from said light source.

12. The display apparatus according to claim 1, wherein said light quantity controlling means is means to control voltage or current to be supplied to said light source.

13. A display apparatus for irradiating a light modulating element with light from a light source and forming a display image plane from the light which is transmitted through or reflected by the light modulating element, comprising:
    input image calculating means for performing a predetermined calculation according to an input display signal;
    light quantity controlling means for controlling a light quantity irradiated onto said light modulating element according to a result of said calculation;
    a memory for storing the display signal subjected to the calculation by said input image calculating means, and thereafter for outputting the display signal to said light modulation element; and
    sensors for detecting the light quantity irradiated onto said light modulating element, wherein said light quantity controlling means controls the light quantity based on the calculation results and a detection results by said sensors.

14. A display apparatus for irradiating light generated by a light source onto a light modulating element to input a modulated signal formulated by converting a display signal inputted in an analog state into a digital display signal and thereafter subjecting the digital display signal to a predetermined processing, and for forming a display image plane from the light transmitted through or reflected by the light modulating element, comprising:

input image calculating means for performing a predetermined calculation according to the display signal;

light quantity controlling means for controlling a light quantity irradiated onto said light modulating element according to a result of said calculation;

an adjusting circuit for adjusting the display signal according to a result of the calculation, wherein said adjusting circuit adjusts the display signal before the display signal in said analog state are converted into digital display signal; and sensors for detecting the light quantity irradiated onto said light modulating element, wherein said light quantity controlling means controls the light quantity based on the calculation results and a detection results by said sensors.

15. A display apparatus for irradiating light generated by a light source onto a light modulating element, and for forming a display image plane with the light transmitted through or reflected by the light modulating element, comprising:

input image calculating means for performing a predetermined calculation according to an input display signal;

light quantity controlling means for controlling a light quantity irradiated onto said light modulating element according to a result of the calculation, wherein said light quantity controlling means sets a change rate of light quantity, such that the change rate at decreasing the light quantity is smaller than a change rate at increasing the light quantity; and sensors for detecting the light quantity irradiated onto said light modulating element, wherein said light quantity controlling means controls the light quantity based on the calculation results and a detection results by said sensors.

16. A display apparatus for irradiating a light modulating element with light from a light source and forming a display image plane from the light which is transmitted through or reflected by the light modulating element, comprising:

input image calculating means for performing a predetermined calculation according to an input display signal;

light quantity controlling means for controlling a light quantity irradiated onto said light modulating element according to a result of said calculation;

a memory for storing the display signal subjected to the calculation by said input image calculating means, and thereafter for outputting the display signal to said light modulation element; and an adjusting circuit for adjusting display signal according to said calculation result, and a sensor for detecting light quantity irradiated onto said light modulating element, wherein said adjusting circuit performing the adjustment according to the calculation result and the detection result by said sensor.

17. A display apparatus for irradiating light generated by a light source onto a light modulating element, and for forming a display image plane with the light transmitted through or reflected by the light modulating element, comprising:

input image calculating means for performing a predetermined calculation according to an input display signal;

light quantity controlling means for controlling a light quantity irradiated onto said light modulating element according to a result of the calculation, wherein said light quantity controlling means sets a change rate of light quantity, such that the charge rate at decreasing the light quantity is smaller than a change rate at increasing the light quantity; and an adjusting circuit for adjusting display signal according to said calculation result, and a sensor for detecting light quantity irradiated onto said light modulating element, wherein said adjusting circuit performing the adjustment according to the calculation result and the detection result by said sensor.

18. An image signal processing apparatus used in a display apparatus having a light source and a light modulating element for modulating light irradiated from the light source, comprising:

input image calculating means for performing predetermined calculation according to an input display signal; and means for outputting a control value to increase or decrease a light quantity irradiated onto said light modulating element step by step according to a value determined by said calculation, wherein a threshold value at which said means for outputting a control value outputs a control value to increase a first stage being a predetermined stage into a second stage by increasing said light quantity by one step corresponding to a value determined by said calculation is different from a threshold value at which said means output a control value decreased from the second stage into a stage with less light quantity.

* * * * *

UNITED STATES PATENT AND TRADEMARK OFFICE
CERTIFICATE OF CORRECTION

PATENT NO. : 7,027,016 B2
APPLICATION NO. : 09/845282
DATED : April 11, 2006
INVENTOR(S) : Yukihiko Sakashita It is certified that error appears in the above-identified patent and that said Letters Patent is hereby corrected as shown below:

ON COVER PAGE AT (57) ABSTRACT

Line 8, "an" should read --a--; and
Line 9, "an" should read --a--.

COLUMN 1

Line 26, "is" should read --are--;
Line 54, "wit" should read --with--; and
Line 59, "that there is a long way to win" should read --competing--.

COLUMN 2

Line 48, "are" should read --is--.

COLUMN 3

Line 56, "set" should read --is set--.

COLUMN 4

Line 14, "setting is" should read --settings are--; and
Line 44, "adopts" should read --adopt--.

COLUMN 17

Line 27, "with" should be deleted; and
Line 28, "that" should read --an--.

COLUMN 19

Line 15, "an" should read --a--;
Line 25, "does" should read --do--;
Line 31, "viate" should read --viates--;
Line 35, "rectangular" should read --rectangle--;
Line 42, "one" should read --single--; and
Line 60, "positions" should read --position with--.

UNITED STATES PATENT AND TRADEMARK OFFICE
CERTIFICATE OF CORRECTION

| | |
|---|---|
| PATENT NO. | : 7,027,016 B2 |
| APPLICATION NO. | : 09/845282 |
| DATED | : April 11, 2006 |
| INVENTOR(S) | : Yukihiko Sakashita |

It is certified that error appears in the above-identified patent and that said Letters Patent is hereby corrected as shown below:

COLUMN 20

Line 6, "either" should be deleted; and
    Line 8, "range" should read --range and--.

COLUMN 22

Line 18, "include" should be deleted;
    Line 23, "a" should be deleted; and
    Line 64, "a" should be deleted.

COLUMN 23

Line 15, "are" should read --is--;
    Line 20, "a" should be deleted; and
    Line 39, "a" should be deleted.

COLUMN 24

Line 49, "output" should read --outputs--.

Signed and Sealed this

Twenty-fourth Day of October, 2006

JON W. DUDAS
*Director of the United States Patent and Trademark Office*

UNITED STATES PATENT AND TRADEMARK OFFICE
CERTIFICATE OF CORRECTION

PATENT NO.         : 7,027,016 B2                                        Page 1 of 1
APPLICATION NO. : 09/845282
DATED              : April 11, 2006
INVENTOR(S)        : Yukihiko Sakashita It is certified that error appears in the above-identified patent and that said Letters Patent is hereby corrected as shown below:

ON COVER PAGE AT (30) FOREIGN APPLICATION PRIORITY DATA

"April 26, 2001 .................. 2000-129125" should read --April 26, 2001 ................... 2001-129125--.

Signed and Sealed this

Twenty-seventh Day of March, 2007

JON W. DUDAS
*Director of the United States Patent and Trademark Office*